United States Patent
Li et al.

(10) Patent No.: US 9,736,836 B2
(45) Date of Patent: Aug. 15, 2017

(54) METHODS AND DEVICES FOR TRANSMITTING AND RECEIVING SYNCHRONOUS CHANNELS AND BROADCASTING CHANNELS

(71) Applicant: Samsung Electronics Co., Ltd., Gyeonggi-do (KR)

(72) Inventors: Yingyang Li, Beijing (CN); Chengjun Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 119 days.

(21) Appl. No.: 14/038,157

(22) Filed: Sep. 26, 2013

(65) Prior Publication Data

US 2014/0086111 A1    Mar. 27, 2014

(30) Foreign Application Priority Data

Sep. 26, 2012    (CN) .......................... 2012 1 0365116

(51) Int. Cl.
| | |
|---|---|
| *H04W 72/04* | (2009.01) |
| *H04W 56/00* | (2009.01) |
| *H04L 5/00* | (2006.01) |
| *H04L 5/14* | (2006.01) |
| *H04W 72/00* | (2009.01) |

(52) U.S. Cl.
CPC ......... *H04W 72/0446* (2013.01); *H04L 5/001* (2013.01); *H04L 5/0048* (2013.01); *H04L 5/0053* (2013.01); *H04L 5/0082* (2013.01); *H04L 5/143* (2013.01); *H04W 56/00* (2013.01); *H04W 72/00* (2013.01)

(58) Field of Classification Search
CPC ....... H04L 5/0082; H04L 5/143; H04L 5/001; H04L 5/0048; H04L 5/0053; H04W 72/0446; H04W 56/00; H04W 72/00
See application file for complete search history.

(56) References Cited

U.S. PATENT DOCUMENTS

| | | | | |
|---|---|---|---|---|
| 2008/0273522 | A1* | 11/2008 | Luo et al. ..................... | 370/350 |
| 2009/0176463 | A1* | 7/2009 | Raaf ................... | H04B 7/0689 |
| | | | | 455/101 |
| 2011/0151876 | A1* | 6/2011 | Ishii et al. ..................... | 455/437 |
| 2012/0002596 | A1* | 1/2012 | Kim ..................... | H04B 7/0413 |
| | | | | 370/315 |
| 2012/0027120 | A1* | 2/2012 | Noh ....................... | H04L 1/0026 |
| | | | | 375/295 |
| 2012/0155414 | A1* | 6/2012 | Noh et al. ..................... | 370/329 |
| 2012/0163335 | A1* | 6/2012 | Chung et al. ................ | 370/330 |
| 2014/0204851 | A1* | 7/2014 | Chen .................... | H04W 48/12 |
| | | | | 370/329 |
| 2014/0254504 | A1* | 9/2014 | Bashar et al. ................ | 370/329 |

(Continued)

OTHER PUBLICATIONS

MediaTek Inc., "ePDCCH Transmission in PRBs where there are PBCH or PSS/SSS", R1-123337, 3GPP TSG-RAN WG1 #70, Aug. 13-17, 2012.

(Continued)

*Primary Examiner* — Gbemileke J Onamuti
(74) *Attorney, Agent, or Firm* — The Farrell Law Firm, P.C.

(57) ABSTRACT

A method for multiplexing synchronous signals on specific OFDM symbols to form P-SCH and the S-SCH channels is provided. The present application further discloses a method for transmitting P-BCH.

26 Claims, 24 Drawing Sheets

(56) References Cited

U.S. PATENT DOCUMENTS

2014/0307729 A1* 10/2014 Son et al. .................... 370/350

OTHER PUBLICATIONS

Qualcomm Incorporated, "Synchronized New Carrier", R1-122769, 3GPP TSG-RAN WG1 #69, May 21-25, 2012.
Alcatel-Lucent, Alcatel-Lucent Shanghai Bell, "On Synchronized New Carriers", R1-122470, 3GPP TSG RAN WG1 Meeting #69, May 21-25, 2012.
Samsung, "Details on Synchronization Signal Mapping for the New Carrier Type", R1-122226, 3GPP TSG RAN WG1 Meeting #69, May 21-25, 2012.

* cited by examiner

METHODS AND DEVICES FOR TRANSMITTING AND RECEIVING SYNCHRONOUS CHANNELS AND BROADCASTING CHANNELS

PRIORITY

This application claims priority under 35 U.S.C. §119(a) to a Chinese Patent Application filed on Sep. 26, 2012 and assigned Serial No. 201210365116.6 in the Chinese Patent Office, the entire disclosure of each of which is incorporated herein by reference.

BACKGROUND OF THE INVENTION

1. Field of the Invention

The present invention relates generally to wireless communication systems, and, more particularly, to methods and devices for transmitting and receiving synchronous channels and broadcasting channels.

2. Description of the Related Art

In 3GPP Long Term Evolution (LTE) systems, each radio frame has a length of 10 ms, which is divided into 10 sub-frames. One downlink transmission time interval (TTI) is defined on one sub-frame. FIG. 1 shows the frame structure of the Frequency Division Duplex (FDD) system, where each downlink sub-frame consists of two slots, each slot comprises 7 Orthogonal Frequency Division Multiplexing (OFDM) symbols in length for a normal cyclic prefix (CP), and each slot comprises 6 OFDM symbols in length for an extended CP. FIG. 2 shows the frame structure of the Time Division Duplex (TDD) system, where each radio frame is divided into two half frames, each 5 ms long, and sub-frame 1 and sub-frame 6 each comprise 3 special domains, namely, a Downlink Pilot Time Slot (DwPTS), a Guard Period (GP) and an Uplink Pilot Time Slot (UpPTS), for an overall length of 1 ms.

FIG. 3 shows the sub-frame structure of an LTE system. The first n OFDM symbols, where n equals 1, 2 or 3, are for transferring downlink control information including Physical Downlink Control Channel (PDCCH) and other control information, and the remaining OFDM symbols are used for transferring the Physical Downlink Shared Channel (PDSCH). Resources are allocated per user in the time domain and frequency domain. A Physical Resource Block (PRB) is the basic unit of allocation, comprising 12 consecutive sub-carriers in frequency, corresponding to one slot in the time domain. If the sub-frame consists of two consecutive slots, two PRBs within two slots on the same sub-carrier within one sub-frame are named a PRB pair. Each Resource Element (RE) within each PRB pair, is the smallest unit of time-frequency resource, i.e. it is a sub-carrier in frequency, but an OFDM symbol in time. REs can play different roles, for example, some REs are used for transmitting a Cell-specific Reference Signal (CRS), some REs are used for transmitting a User-specific Demodulation Reference Signal (DMRS), some REs are used for transmitting a Channel State Indication Reference Signal (CSI-RS), etc.

In an LTE system, the Synchronous channel (SCH) is transmitted with a periodicity of 5 ms. As shown by FIG. 4, in an FDD radio frame, a Primary Synchronous channel (P-SCH) is located in 72 sub-carriers in the middle of the last OFDM symbol of slot 0 and slot 10, and a Secondary Synchronous channel (S-SCH) is located in 72 sub-carriers in the middle of the second-to-last OFDM symbol of slot 0 and slot 10. In other words, the P-SCH and S-SCH of an FDD system frame occupy contiguous OFDM symbols. As shown by FIG. 5, in a TDD radio 15 frame, the Primary Synchronous channel (P-SCH) is located in 72 sub-carriers in the middle of the third OFDM symbol in the DwPTS domain of sub-frame 1 and sub-frame 6, and the Secondary Synchronous channel (S-SCH) is located in 72 sub-carriers in the middle of the last OFDM symbol of slot 0 and slot 5. In other words, P-SCH and S-SCH of a TDD system frame are 3 OFDM symbols apart.

In an LTE system, the transmission period of the Primary Broadcasting Channel (P-BCH) is 40 ms. The period is split into 4 P-BCH bursts that are respectively mapped to slot 1 of 4 radio frames within the period. As shown by FIG. 4 and FIG. 5, in both the FDD system and the TDD system, the P-BCH burst is mapped to the first 4 OFDM symbols of slot 1 in time, and occupies 72 sub-carriers in the middle of bandwidth in the frequency domain.

In that case, in a LTE system, the User Equipment (UE) detects a service cell by the following process: first, P-SCH is synchronized with S-SCH to detect Physical Identity of Cell (PID), because the relative positions of P-SCH and S-SCH in the FDD system and TDD system frames are different, an FDD system can be distinguished from a TDD system based on the relative positions of the P-SCH and the S-SCH. Second, the UE detects the position of CRS so as to verify whether the detected PID is an effective cell. Last, the UE demodulates the P-BCH so as to obtain primary broadcasting information of the cell.

Reducing the costs of the subsequent compatible control signaling and CRS, and reducing the disturbances introduced by the subsequent compatible control signaling and CRS, will improve the utility rate of the frequency spectrum of the UE in further evolutions of the LTE system. The reduction in the cost of CRS also improves the power saving performance of the system. PDCCH and PDSCH transmissions in such a system are generally demodulated based on DMRS, which is generally referred to as a New Carrier Type (NCT).

As a result of the demodulation in an NCT cell being based on DMRS, all of the legacy UEs cannot work in an NCT cell, because the legacy UEs receive control information based on CRS to some extent. As for the legacy UE, when it attempts to initially access to a cell that operates in the NCT pattern, such initial access is doomed to fail.

NCT cells can be categorized into two types, in accordance with whether it can operate as a standalone cell. In a non-standalone case, it can only operate as a Secondary Cell (Scell) in a Carrier Aggregation (CA) system, and if the NCT cell cannot synchronize with other CA cells, P-SCH and S-SCH are still required, but P-BCH and other broadcasting information no longer need to be transmitted, resulting in reduced costs. In the standalone case, all channels from the legacy LTE system are in need of corresponding defined alternatives in the NCT system, particularly, P-SCH, S-SCH and P-BCH are required to be transmitted. Therefore, there is a need to provide a method and device for transmitting P-SCH, S-SCH and P-BCH in an NCT system.

SUMMARY OF THE INVENTION

The present invention addresses at least the above problems and provides at least the advantages described below. According to one aspect of the present invention, a method and a device are provided for transmitting and receiving synchronous channels and broadcasting channels with respect to a new type of OFDM-based carrier. According to another aspect of the present invention, conflicts of OFDM symbols between P-SCH, S-SCH and DMRS, CSI-RS, TRS, are avoided so as to increase flexibility in system configuration, and reduce complexity in the search for synchronous channels by a UE in the current LTE system and the NCT system. According to yet another aspect of the invention, conflicts of OFDM symbols between P-BCH and CSI-RS are avoided so as to increase flexibility in system configuration of CSI-RS, and to ensure P-BCH transmission performance in the NCT system.

According to an aspect of the present invention, a method for transmitting a synchronous channel includes generating synchronous signals transmitted on a Primary Synchronous Channel (P-SCH) and a Secondary Synchronous Channel (S-SCH); multiplexing the synchronous signals to specific Orthogonal Frequency Division Multiplexing (OFDM) symbols to form the P-SCH and the S-SCH channels, wherein the specific OFDM symbols do not bear thereon any of a User-specific Demodulation Reference Signal (DMRS), a Channel State Indication Reference Signal (CSI-RS) or a Tracking Reference Signal (TRS); and transmitting the P-SCH and the S-SCH channels. According to another aspect of the present invention, a method for receiving a synchronous channel includes detecting and receiving signals; demultiplexing specific Orthogonal Frequency Division Multiplexing (OFDM) symbols to obtain synchronous signals of a Primary Synchronous Channel (P-SCH) and a Secondary Synchronous Channel (S-SCH), wherein the specific OFDM symbols do not bear thereon any of a User-specific Demodulation Reference Signal (DMRS), a Channel State Indication Reference Signal (CSI-RS) or a Tracking Reference Signal (TRS); and carrying out system synchronization based on the synchronous signals.

According to another aspect of the present invention, a method for transmitting a broadcasting channel includes generating a broadcasting signal to be transmitted on a Primary Broadcasting Channel (P-BCH); multiplexing the broadcasting signal to corresponding Orthogonal Frequency Division Multiplexing (OFDM) symbols to form the P-BCH, wherein the corresponding OFDM symbols do not bear thereon any of a Channel State Indication Reference Signal (CSI-RS) or synchronous signals; and transmitting the P-BCH channel.

According to another aspect of the present invention, a method for receiving a broadcasting channel includes detecting and receiving signals; demultiplexing a broadcasting signal from corresponding Orthogonal Frequency Division Multiplexing (OFDM) symbols to obtain a broadcasting signal transmitted on a Primary Broadcasting Channel (P-BCH), wherein the corresponding OFDM symbols do not bear thereon any of a Channel State Indication Reference Signal (CSI-RS) or synchronous signals; and obtaining broadcasting information based on the broadcasting signal.

According to another aspect of the present invention, a base station device includes a signal generating module configured to generate synchronous signals to be transmitted on a Primary Synchronous Channel (P-SCH) and a Secondary Synchronous Channel (S-SCH); a multiplexing module configured to multiplex the synchronous signals to specific Orthogonal Frequency Division Multiplexing (OFDM) symbols to form the P-SCH and the S-SCH channels, wherein the specific OFDM symbols do not bear thereon any of a User-specific Demodulation Reference Signal (DMRS), a Channel State Indication Reference Signal (CSI-RS) or a Tracking Reference Signal (TRS); and a transmitting module configured to transmit the P-SCH and the S-SCH channels.

According to another aspect of the present invention, a terminal device includes a receiving module configured to detect and receive signals; a demultiplexing module configured to demultiplex specific Orthogonal Frequency Division Multiplexing (OFDM) symbols to obtain synchronous signals of a Primary Synchronous Channel (P-SCH) and a Secondary Synchronous Channel (S-SCH), wherein the specific OFDM symbols do not bear thereon any of a User-specific Demodulation Reference Signal (DMRS), a Channel State Indication Reference Signal (CSI-RS) or a Tracking Reference Signal (TRS); and a synchronizing module configured to carry out system synchronization based on the synchronous signals.

According to another aspect of the present invention, a base station device includes a signal generating module for generating a broadcasting signal transmitted on P-BCH channel; a multiplexing module configured to multiplex the broadcasting signal to the corresponding OFDM symbols to form the P-BCH, wherein, the corresponding OFDM symbols do not bear thereon any of a Channel State Indication Reference Signal (CSI-RS) or synchronous signals; and a transmitting module for transmitting the P-BCH channel.

According to another aspect of the present invention, a terminal device includes a receiving module configured to detect and receive signals; a demultiplexing module configured to demultiplex a broadcasting signal from corresponding Orthogonal Frequency Division Multiplexing (OFDM) symbols to obtain a broadcasting signal transmitted on a Primary Broadcasting Channel (P-BCH), wherein the corresponding OFDM symbols do not bear thereon any of a Channel State Indication Reference Signal (CSI-RS) or synchronous signals; and an interpreting module configured to acquire broadcasting information based on the broadcasting signal.

BRIEF DESCRIPTION OF THE DRAWINGS

The above aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
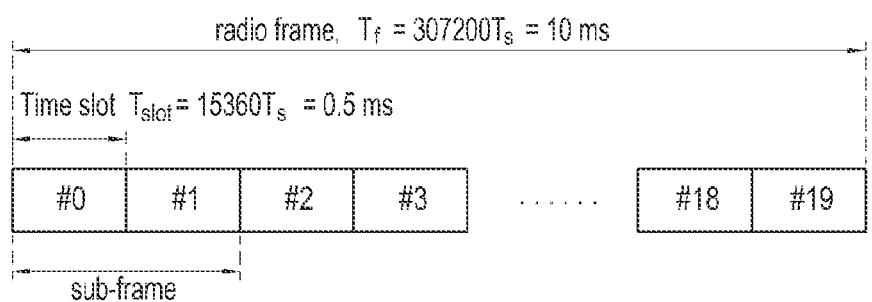
FIG. 1 is a schematic diagram of a frame structure of an FDD system.
Figure 2:
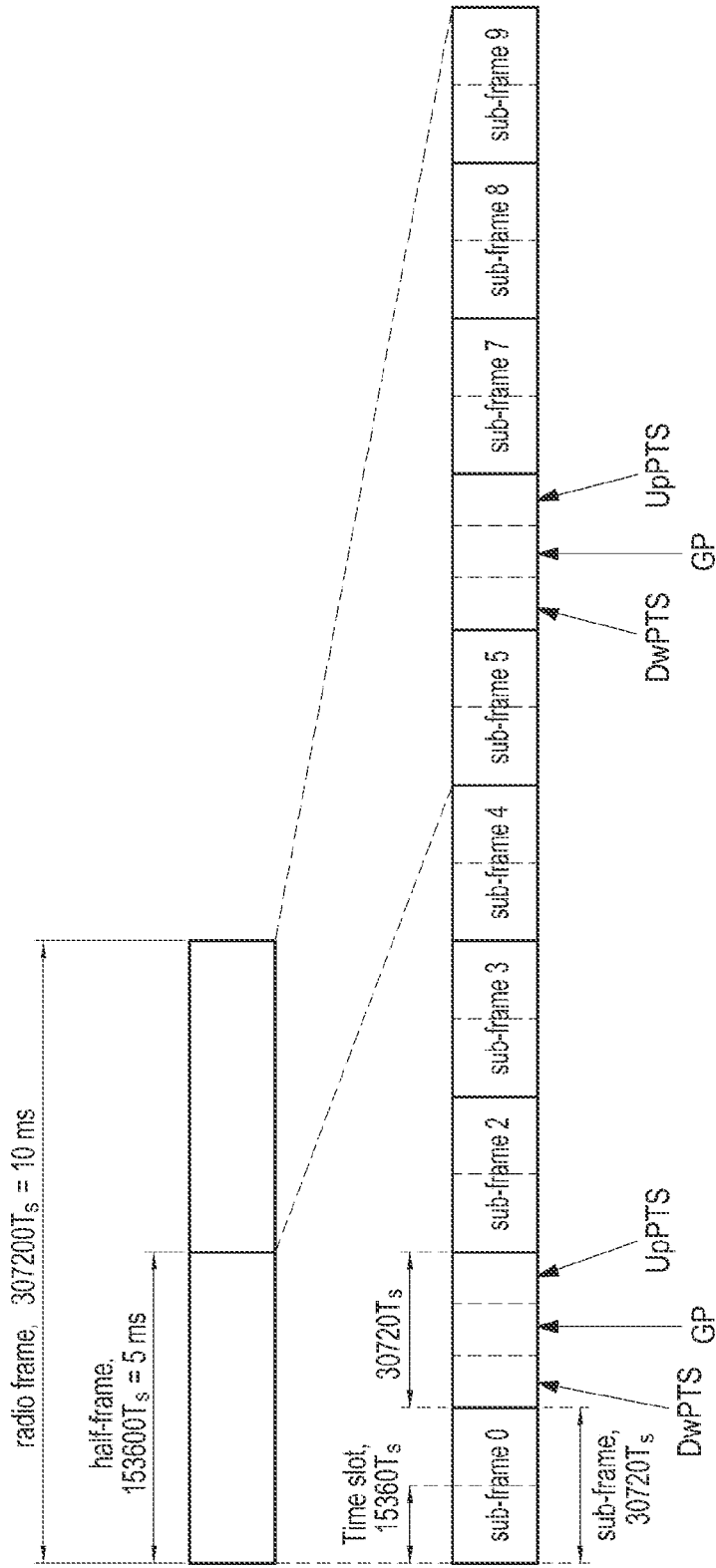
FIG. 2 is a schematic diagram of a frame structure of a TDD system.
Figure 3:
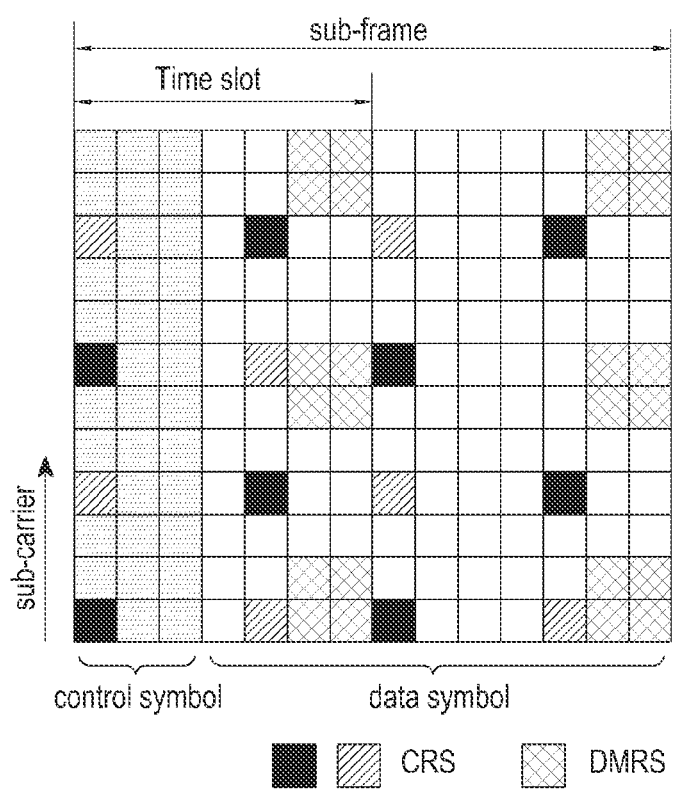
FIG. 3 is a schematic diagram of a sub-frame structure in a LTE system.
Figure 4:
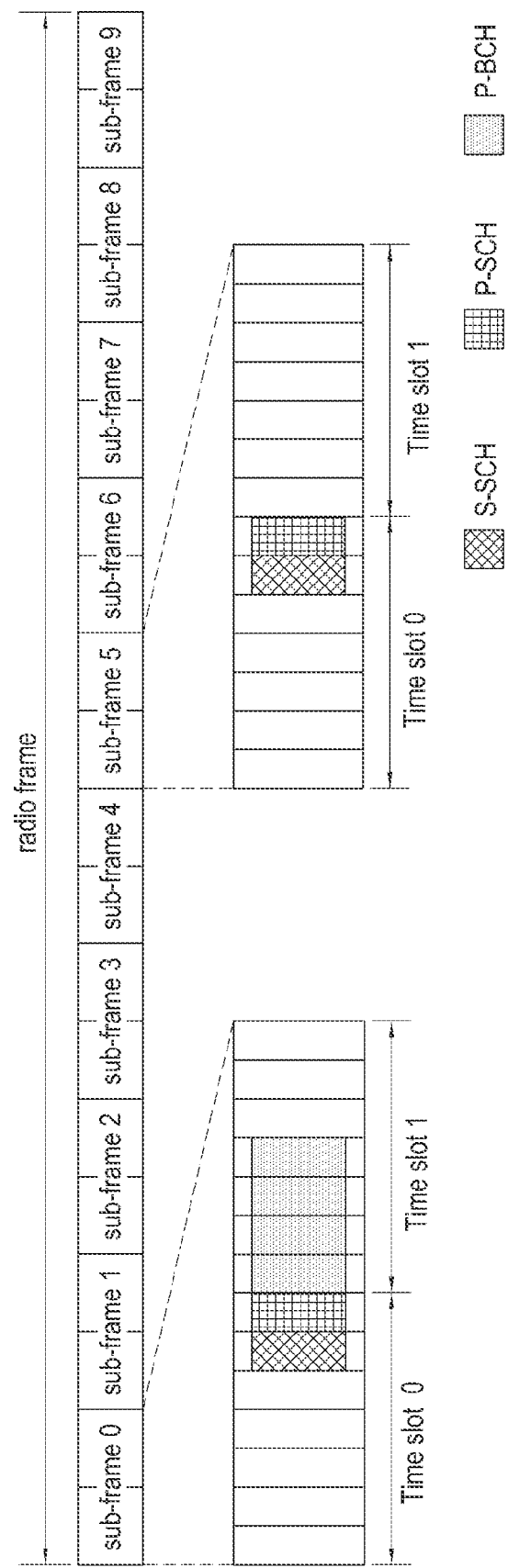
FIG. 4 is a schematic diagram of a synchronous channel and P-BCH of an FDD system.
Figure 5:
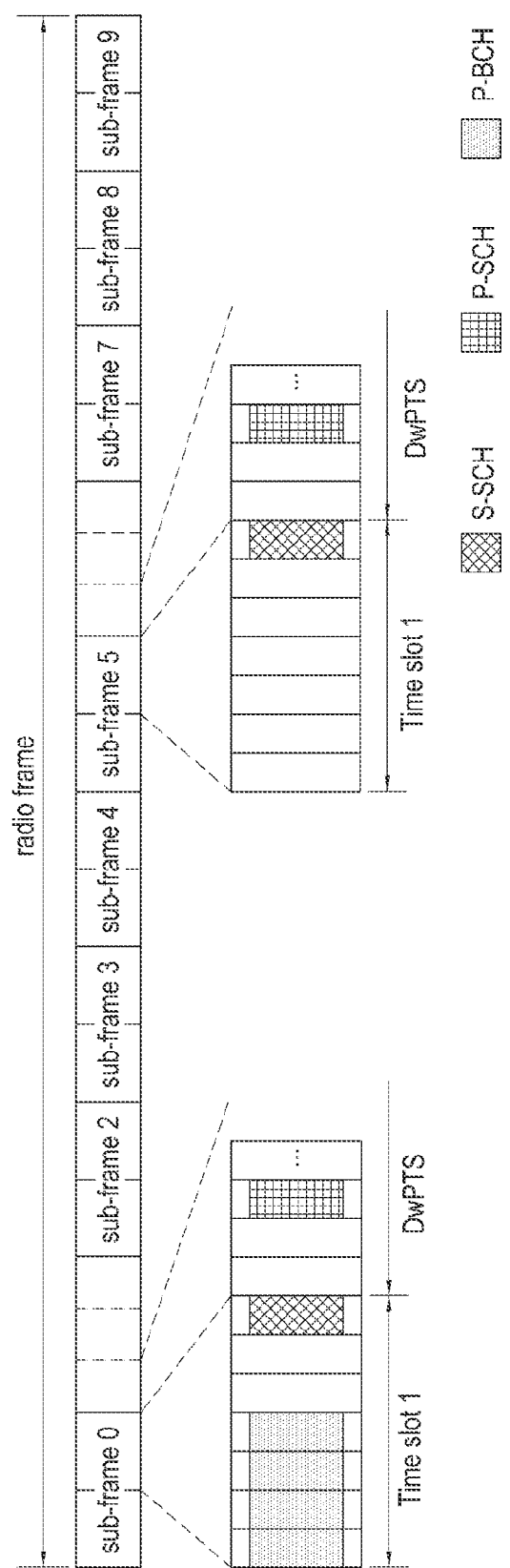
FIG. 5 is a schematic diagram of a synchronous channel and P-BCH of a TDD system.

Embodiments of the present invention are described in detail with reference to the accompanying drawings. In the drawings, same or similar symbols represent same or similar elements or elements having same or similar functions. The embodiments described by reference to the drawings are examples, which only serve to illustrate the present invention, and cannot be interpreted as a limit thereto.

As used herein, "terminal device" includes both equipment having a wireless signal receiver incapable of transmitting and equipment having a wireless signal transceiver capable of both receiving and transmitting, i.e., having hardware for bidirectional communications on a bidirectional communication link. Such terminal devices include: any cellular or other communication equipment with or without multi-line display; a personal communication system (PCS) which is able to combine voice and data processing, a facsimile and/or data communication device; a personal digital assistant (PDA) which may comprise a radio frequency receiver and a pager, internet/intranet access, a network browser, a notebook, a calendar and/or a global position system (GPS) receiver; and/or a regular laptop, palm, or tablet computer including a radio frequency receiver, or other devices. As used herein, "terminal" and "terminal device" may be portable, transportable, mounted on vehicles (aviation, marine and/or land), or be suitable for and/or be configured to operate locally and/or operate in any other location on the earth and/or in the space in a distributed manner.

Moreover, the base station devices described herein are any that may be used for communicating with one or more terminal devices. These include, but are not limited to, base stations known as access nodes, Node B devices, or other terms.

With respect to the NCT cell mentioned above, when it operates as a stand-alone cell, or when it is configured as a unit carrier of the CA system, but does not synchronize with other unit carriers, transmission of synchronous channels become necessary. Based on the design of synchronous channels of the current LTE system, synchronous channels of NCT cell may comprise P-SCH and S-SCH. The positions of P-SCH and S-SCH in the current LTE system are in conflict with the position where DMRS resides, and are in conflict with a part of CSI-RS resources. To enhance the flexibility of the NCT system to control PDSCH and transmission of CSI-RS, it is necessary to alter the OFDM symbols occupied by P-SCH and S-SCH. Embodiments of the present invention described below provide time positions of P-SCH and S-SCH in a radio frame, but do not restrict other prior designs of P-SCH and S-SCH. For example, P-SCH and S-SCH may still occupy 72 sub-carriers in the middle of the bandwidth, in addition, the P-SCH and the S-SCH sequences can multiplex the prior designs of and similar designs to LTE.

In an NCT system, a portion of OFDM symbols in a sub-frame are dedicated to a specific use. To be specific, a portion of OFDM symbols within a sub-frame are used for bearing DMRS, used for demodulating downlink transmission signals. For instance, according to the design of the current LTE system, as for a normal sub-frame, DMRS is transmitted on the last two OFDM symbols of each slot. A portion of OFDM symbols of a sub-frame may be configured to transmit CSI-RS. For example, according to the design of LTE FDD system, for a normal sub-frame, the last two OFDM symbols of the first time slot as well as the third, fourth, sixth and seventh OFDM symbols of the second time slot may be used for CSI-RS transmission. Besides, accurate synchronization of time and frequency on NCT further requires transmission of a Tracking Reference Signal (TRS) for synchronous tracking of time and frequency.

For example, TRS may multiplex the time-frequency mapping structure of the current CRS port 0, i.e. for a normal CP sub-frame, TRS occupies the first and the fourth OFDM symbols of each slot. In case it is necessary to locate the positions of P-SCH and S-SCH in a radio frame, embodiments of the present invention employ OFDM symbols in a sub-frame except for the OFDM symbols that are used for, or may be used for, DMRS, CSI-RS or TRS. Use of such a method avoids conflicts of OFDM symbols between P-SCH, S-SCH and DMS, CSI-RS, TRS, so as to enhance flexibility of system configuration. Here, the impact of CSI-RS can be dealt with either by respectively ensuring, for a system of duplexing pattern (FDD or TDD), that all OFDM symbols available for CSI-RS are not used for P-SCH or S-SCH transmission; or by ensuring, for the FDD and TDD systems, that OFDM symbols in both systems for bearing CSI-RS are not used for P-SCH or S-SCH transmission.

As for the legacy UE, when it attempts to initially access to a cell that operates in NCT pattern, such initial access is doomed to fail. There are different design methods to access synchronous channels in the NCT cell based on the time point of failure detected by UE. For example, in one design solution, the relative positions of the P-SCH and the S-SCH in LTE system remain unchanged, in other words, in the FDD system of NCT, S-SCH and P-SCH still occupy the contiguous OFDM symbols, with S-SCH arranged in front of P-SCH, and in the TDD system of NCT, S-SCH and P-SCH maintain a distance of 3 OFDM symbols, with S-SCH arranged in front of P-SCH. In such a solution, after detecting P-SCH and S-SCH, the legacy UE believes it has identified an available cell, and carries out subsequent operations based on the cell ID, but such subsequent operations will end up in failure, so as to inhibit the legacy UE from accessing to the NCT cell.

Thus, to enable the legacy UE to detect as soon as possible that it is an NCT cell which objects its access, the relative positions of the P-SCH and the S-SCH of the NCT cell in embodiments of the present invention are different from those in the current LTE system, and the same relative positions of the P-SCH and the S-SCH are employed for the NCT systems of FDD and TDD. In other words, on the basis that there are already two types of relative positions of P-SCH and S-SCH in the LTE system, embodiments of the present invention introduce a third type of relative position of P-SCH and S-SCH which is at the same time suitable for use in NCT systems of FDD and TDD. Use of the method presented by embodiments of the present invention enables the legacy UE to discover inaccessible NCT cells when detecting S-SCH, so as to avoid extra searches by UE; in addition, since only a new type of relative positions of P-SCH and S-SCH is introduced to the NCT, the complexity in searching for synchronous channels of the current LTE system and the NCT system by an UE that supports the NCT system is thereby reduced.

To attain the purpose(s) of the present invention, an embodiment of the present invention provides a method for a base station to transmit synchronous channels, including the following steps: generating synchronous signals transmitted on P-SCH and S-SCH channels; multiplexing the synchronous signals to specific OFDM symbols to form P-SCH and the S-SCH channels, wherein, the specific OFDM symbols do not bear thereon any of the following signals: DMRS, CSI-RS or TRS; and transmitting P-SCH and S-SCH channels.

In one embodiment of the present invention, the above method is applied to an FDD or a TDD communication system, and P-SCH and S-SCH have the same relative positions in the two communication systems.

In one embodiment of the present invention, P-SCH and S-SCH channel in a TDD communication system comprise any of the following bearing modes: OFDM symbol 0 of DwPTS bears P-SCH channel, OFDM symbol 1 of the second time slot in the previous sub-frame of DwPTS bears S-SCH channel; the previous two OFDM symbol of DwPTS respectively transmit P-SCH and the S-SCH channels.

In one embodiment of the present invention, P-SCH and S-SCH channel in an FDD communication system comprise any of the following bearing modes: OFDM symbol 1 of the second time slot of a sub-frame bears P-SCH channel, OFDM symbol 2 of the first time slot in the previous sub-frame bears S-SCH channel; OFDM symbols 1 and 2 of the first time slot in the sub-frame respectively transmit P-SCH and S-SCH channels.

In one embodiment of the present invention, the specific OFDM symbols are symbols without the following features: all the OFDM symbols that can be used for bearing CSI-RS in either of communication systems, or OFDM symbols that can be used for bearing CSI-RS in both communication systems.

To attain the purpose(s) of the present invention, an embodiment of the present invention provides a method for a terminal device to receive synchronous channels, including the following steps: detecting and receiving signals; demultiplexing the specific OFDM symbols to obtain synchronous signals of P-SCH and S-SCH channels, wherein, the specific OFDM symbols do not bear thereon any of the following signals: DMRS, CSI-RS or TRS; carrying out system synchronization based on the synchronous signals.

In one embodiment of the present invention, the system comprises an FDD or a TDD communication system, and P-SCH and S-SCH have same relative positions in the two communication systems.

In one embodiment of the present invention, demultiplexing from a specific OFDM symbol to obtain a synchronous signal in a TDD communication system comprises any of the following modes: obtaining a synchronous signal of P-SCH channel from OFDM symbol 0 of DwPTS, obtaining a synchronous signal of S-SCH channel from OFDM symbol 1 of the second time slot in the previous sub-frame of DwPTS; obtaining synchronous signals of P-SCH and S-SCH channels respectively from the previous two OFDM symbols of DwPTS.

In one embodiment of the present invention, demultiplexing from a specific OFDM symbol to obtain a synchronous signal in an FDD communication system comprises any of the following modes: obtaining a synchronous signal of P-SCH channel from OFDM symbol 1 of the second time slot in the sub-frame, obtaining a synchronous signal of S-SCH channel from OFDM symbol 2 of the first time slot; and obtaining synchronous signals of P-SCH and S-SCH channels respectively from the OFDM symbols 1 and 2 of the first time slot in a sub-frame.

Based on the above principle(s) of design, two examples for configuration of P-SCH and S-SCH according to embodiments of the present invention are described below.

Example 1

Assume that the time-frequency structure of DMRS, and the time-frequency structure of CSI-RS in the current LTE version, are multiplexed, and assume that TRS multiplexes the time-frequency structure of the current CRS port 0. For FDD and TDD systems hereof, assume that only OFDM symbols that can be used for bearing CSI-RS in both of the systems and be not used for transmitting P-SCH or S-SCH. According to this embodiment of the present invention, new relative positions of P-SCH and S-SCH different from the current LTE system are introduced, and such new relative positions are adopted consistently in FDD and TDD systems of NCT.

Figure 6:
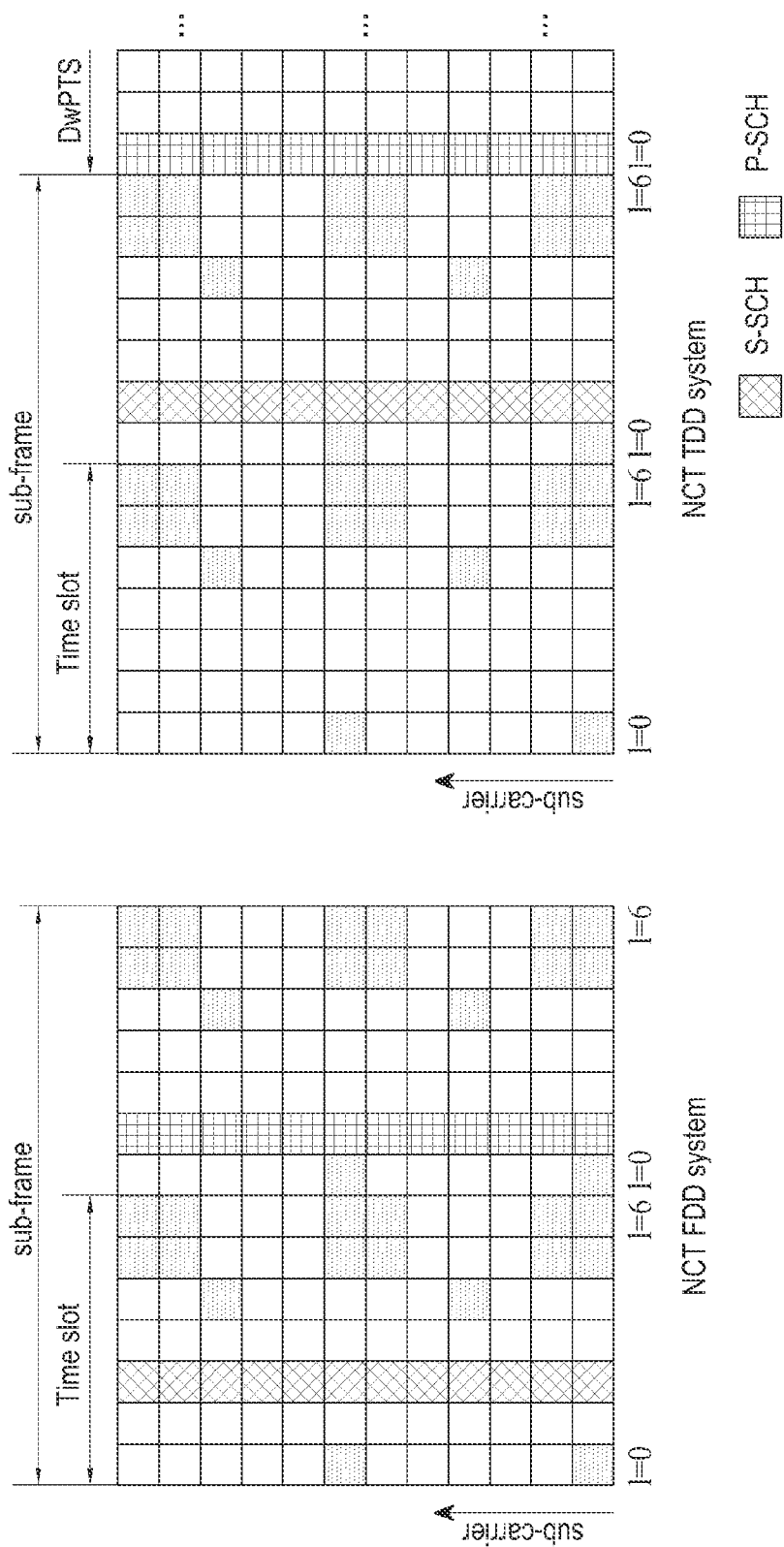
FIG. 6 is a mapping diagram of a synchronous channel having a CP frame structure, according to an embodiment of the present invention, as discussed in reference to Example 1.

FIG. 6 shows a schematic diagram of a synchronous signal having a normal CP frame structure. In a normal sub-frame, in order to avoid conflicts between OFDM symbols of DMRS, CSI-RS or TRS, only OFDM symbols 1, 2, 3 of the first time slot and OFDM symbol 1 of the second time slot can be used for bearing P-SCH and S-SCH. As to DwPTS of TDD system, because the third OFDM symbol of DwPTS in the current LTE system may be used for bearing DMRS, bearing synchronous channels on two OFDM symbols 0, 1 in DwPTS is an option. As shown by FIG. 6, for TDD system, OFDM symbol 0 of DwPTS may be used for bearing a P-SCH, and OFDM symbol 1 of the second time slot in a previous sub-frame of DwPTS may be used for bearing S-SCH, so that P-SCH and S-SCH in the TDD are at a distance of the length of six OFDM symbols. Correspondingly, in order to maintain P-SCH and S-SCH in FDD system in positions relative to P-SCH and S-SCH in TDD system, OFDM symbol 1 of the second time slot of a sub-frame is used for bearing P-SCH, and OFDM symbol 2 of the first time slot is used for bearing S-SCH, so as to ensure a distance between P-SCH and S-SCH of 6 OFDM symbols as well.

Figure 7:
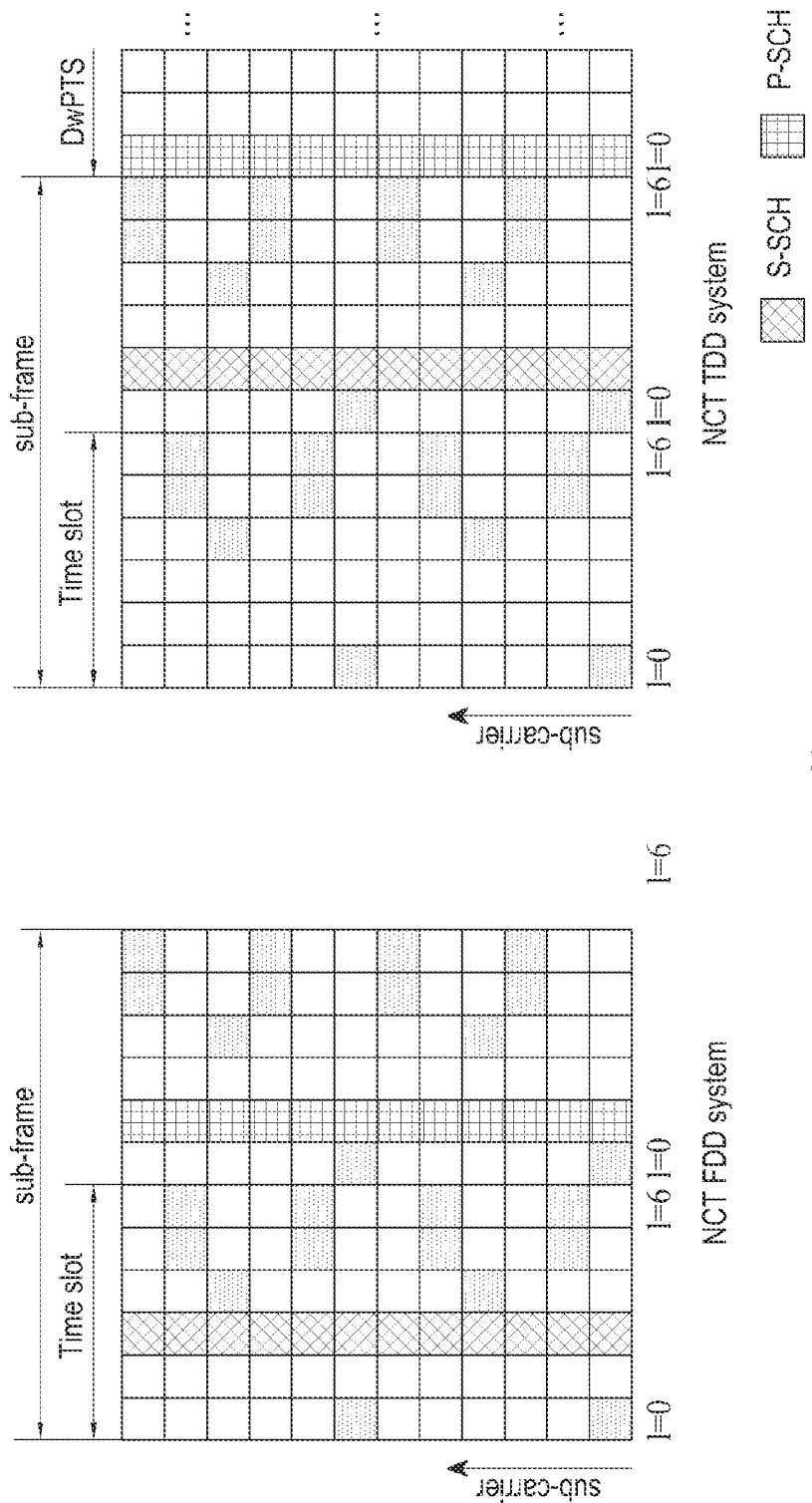
FIG. 7 is a mapping diagram of a synchronous channel having an extended CP frame structure, according to an embodiment of the present invention, as discussed in reference to Example 1.

FIG. 7 shows a schematic diagram of a synchronous signal having an extended CP frame structure. In a normal sub-frame, in order to avoid conflicts between OFDM symbols of DMRS, CSI-RS or TRS, only OFDM symbols 1, 2 of the first time slot and OFDM symbols 1, 2 of the second time slot can be used for bearing P-SCH and S-SCH. As to DwPTS of TDD system, because the third OFDM symbol of DwPTS in the current LTE system may be used for bearing DMRS, bearing synchronous channels on two OFDM symbols 0, 1 in DwPTS is an option. As shown by FIG. 7, for TDD system, OFDM symbol 0 of DwPTS may bear P-SCH, and OFDM symbol 1 of the second time slot in a previous sub-frame of DwPTS may bear S-SCH, so that P-SCH and S-SCH in TDD are at a distance of the length of five OFDM symbols. Correspondingly, in order to maintain P-SCH and S-SCH in FDD system in positions relative to P-SCH and S-SCH in TDD system, OFDM symbol 1 of the second time slot of a sub-frame is used for bearing the P-SCH, and OFDM symbol 2 of the first time slot is used for bearing the S-SCH, so as to ensure a distance between the P-SCH and the S-SCH of 5 OFDM symbols as well.

A person of ordinary skill in the art would understand that the relative position relations between the OFDM symbol occupied by the P-SCH and the OFDM symbol occupied by the S-SCH in the methods as shown by FIG. 6 and FIG. 7 can also be exchanged, i.e., configuring P-SCH in front of S-SCH.

Example 2

Assume that the time-frequency structure of DMRS and the time-frequency structure of CSI-RS in the current LTE version are multiplexed, and assume that TRS multiplexes the time-frequency structure of the current CRS port 0. Here, for each system of duplexing pattern (FDD or TDD), it is respectively ensured that all OFDM symbols available for CSI-RS are not used for transmitting P-SCH or S-SCH. According to this embodiment of the present invention, new relative positions of P-SCH and S-SCH different from the current LTE system are introduced, and new relative positions are adopted consistently in FDD and TDD systems of NCT.

Figure 8:
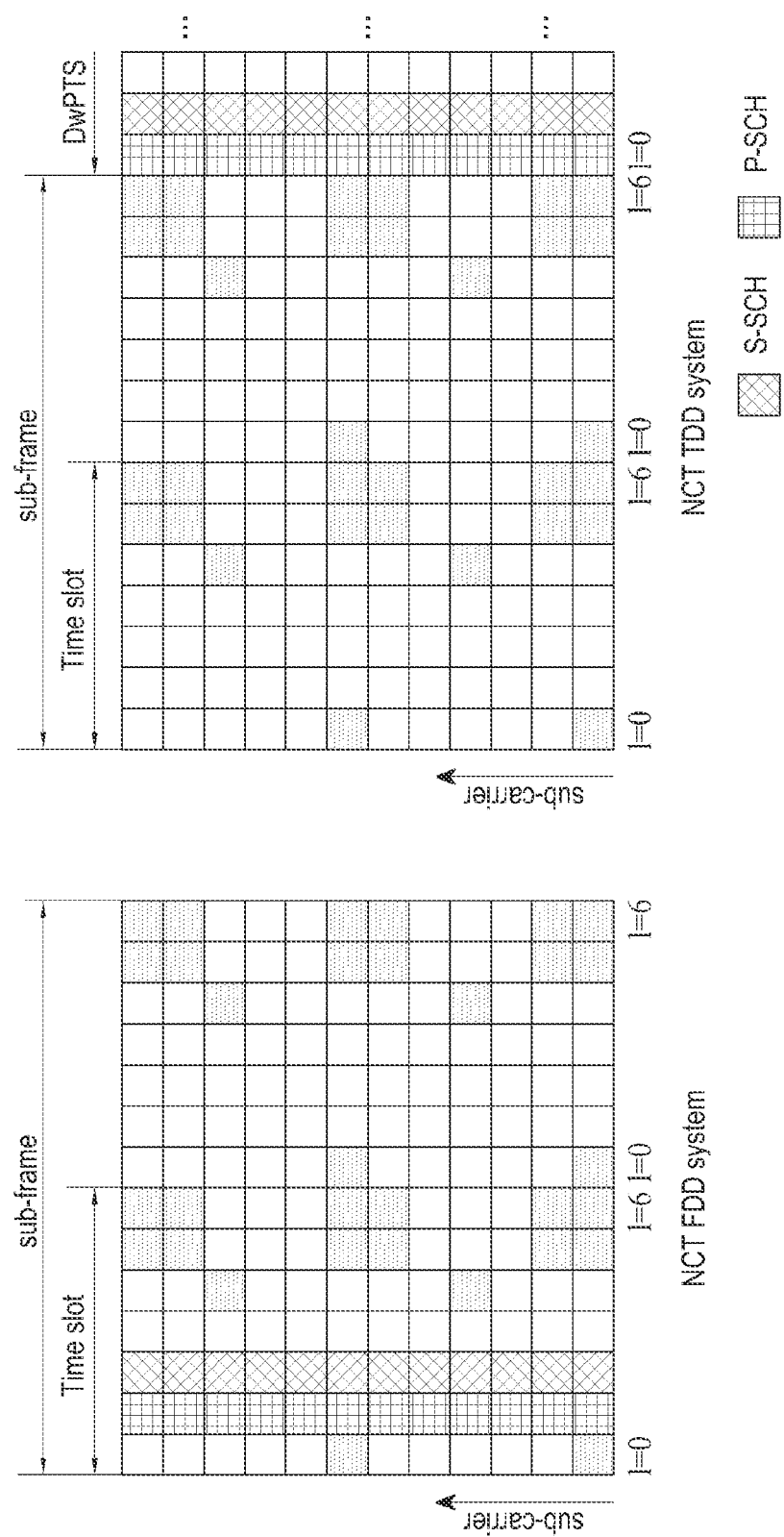
FIG. 8 is a mapping diagram of a synchronous channel having a CP frame structure, according to an embodiment of the present invention, as discussed in reference to Example 2.

FIG. 8 shows a schematic diagram of a synchronous signal having a normal CP frame structure. For TDD system, P-SCH and S-SCH are simultaneously transmitted in DwPTS, and occupy respectively OFDM symbols 0 and 1 of the DwPTS. For FDD system, as shown by FIG. 8, P-SCH and S-SCH can respectively occupy OFDM symbols 1 and 2 of the first time slot of a sub-frame. Alternatively, for FDD system, P-SCH and S-SCH can also respectively occupy OFDM symbols 2 and 3 of the first time slot of a sub-frame.

Figure 9:
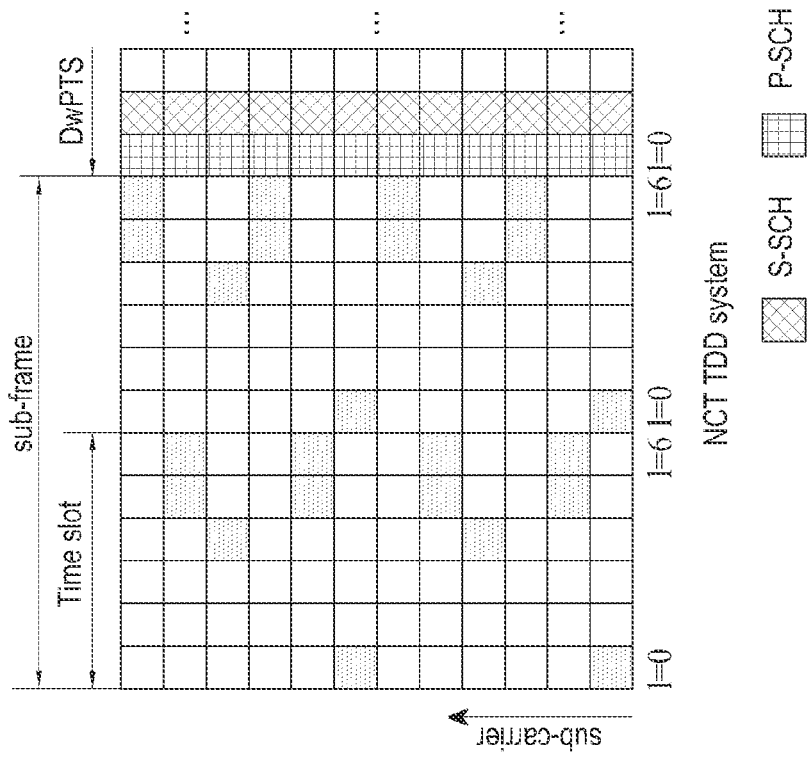
FIG. 9 is a mapping diagram of a synchronous channel having an extended CP frame structure, according to an embodiment of the present invention, as discussed in reference to Example 2.
Figure 9:
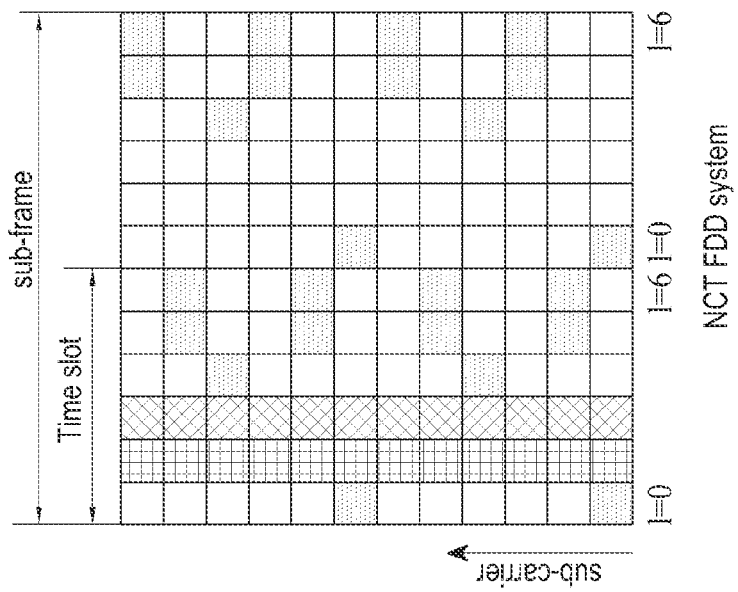

FIG. 9 shows a schematic diagram of a synchronous signal having an extended CP frame structure. For TDD system, P-SCH and S-SCH are still simultaneously transmitted in DwPTS, and occupy respectively OFDM symbols 0 and 1 of DwPTS. For FDD system, as shown by FIG. 8, P-SCH and S-SCH can respectively occupy OFDM symbols 1 and 2 of the first time slot of a sub-frame.

In the schematic diagrams of FIG. 8 and FIG. 9, the FDD system according to this embodiment of the present invention is consistent with the current FDD system, and the P-SCH and the S-SCH occupy contiguous OFDM symbols, however, P-SCH and S-SCH respectively occupy OFDM symbols in different orders, so that the terminal is still able to distinguish the NCT system from the current LTE system.

As to the above NCT cell, when it operates as a standalone cell, the other channel that requires to be transmitted is P-BCH. A method for configuring P-BCH of NCT system according to an embodiment of the present invention is described as follows. In the current LTE system, the position of the P-BCH is in conflict with a part of OFDM symbols occupied by CSI-RS, which results in a restriction on configuring CSI-RS on sub-frame 0. Especially for TDD uplink and downlink configuration 0, since only sub-frame 0 and sub-frame 5 in a radio frame can transmit CSI-RS, resources for transmitting CSI-RS are quite limited. In that case, it is necessary to avoid transmitting P-BCH on OFDM symbols that may be used for CSI-RS, which is thereby conducive to increasing the capacity of alternative resources for CSI-RS, and enhancing flexibility in NCT system configuration. Moreover, if P-BCH occupies the same sub-frame as the synchronous channel, the OFDM symbols for the synchronous channel cannot be used for P-BCH. Thus, when locating the time-frequency position of P-BCH in a radio frame, an embodiment of the present invention employs other OFDM symbols in a sub-frame except for OFDM symbols that are used for, or possibly used for, CSI-RS and synchronous channels. Use of such a method avoids conflicts between OFDM symbols of P-BCH and CSI-RS, so as to enhance flexibility in CSI-RS configuration in the system. Here, the impact of CSI-RS can be dealt with either by respectively ensuring, for a system of any duplexing pattern (FDD or TDD), that all OFDM symbols available for CSI-RS are not used for P-BCH transmission; or by ensuring, for FDD and TDD systems, that OFDM symbols in both systems for bearing CSI-RS are not used for P-BCH transmission. The time position of the P-BCH in a radio frame according to an embodiment of the invention will be discussed below, without limiting other designs of the P-BCH, for example, the P-BCH may still occupy 72 sub-carriers in the middle of the bandwidth, operations like encoding P-BCH and the like may multiplex the prior designs of LTE, etc. Here, P-BCH mapping structures may be designed separately and respectively for FDD and TDD systems; alternatively, the same P-BCH mapping structure may be adopted by FDD and TDD systems so as to increase consistency.

To attain the purpose(s) of the present invention, an embodiment of the present invention provides a method for a base station to transmit broadcasting channels, comprising the following steps: generating a broadcasting signal transmitted on P-BCH channel; multiplexing the broadcasting signal to the corresponding OFDM symbols to form the P-BCH, wherein, the corresponding OFDM symbols do not bear thereon any of the following signals: CSI-RS and synchronous signals; and transmitting the P-BCH channel.

In one embodiment of the present invention, the method is applied in FDD or TDD communication system.

In one embodiment of the present invention, the corresponding OFDM symbols are symbols without the following features: all the OFDM symbols that can be used for bearing CSI-RS in either of communication systems, or OFDM symbols that can be used for bearing CSI-RS in both communication systems.

In one embodiment of the present invention, for each burst of P-BCH channel, the number of RE for P-BCH transmission is determined by parameters of the current LTE system.

In one embodiment of the present invention, OFDM symbol occupied by the P-BCH channel is determined based on the OFDM symbol where DMRS resides.

In one embodiment of the present invention, the P-BCH channel is mapped to four OFDM symbols that transmit TRS.

In one embodiment of the present invention, OFDM symbols, except for the one in the sub-frame for transmitting CSI-RS and synchronous channel, are used for transmitting P-BCH channel.

In one embodiment of the present invention, P-BCH channel is transmitted in any of the following modes including: for a normal CP sub-frame, P-BCH occupies OFDM symbols 0, 3, 4 of the first time slot and OFDM symbols 0, 1, 4 of the second time slot; for an extended CP sub-frame structure, P-BCH occupies OFDM symbols 0, 3 of the first time slot and OFDM symbols 0, 1, 2, 3 of the second time slot; for an extended CP sub-frame structure, P-BCH occupies OFDM symbols 0, 1, 2, 3 of the first time slot and OFDM symbols 0, 3 of the second time slot; for a normal CP sub-frame, P-BCH occupies OFDM symbols 0, 1, 3, 4 of the first time slot and OFDM symbols 0, 4 of the second time slot; and for an extended CP sub-frame structure, P-BCH occupies OFDM symbols 0, 1, 3 of the first time slot and OFDM symbols 0, 2, 3 of the second time slot.

In one embodiment of the present invention, P-BCH channel has one or more of the following features: the number of the occupied sub-carriers being smaller than the number of sub-carriers of six PRBs, and being the number of sub-carriers of integral number of PRBs; occupying PRB resource in the middle of the frequency band; and the PRB resource at both ends of the frequency resource of the 6 PRBs in the middle of the frequency band being used for transmitting P-BCH channel.

To attain the purpose(s) of the present invention, an embodiment of the present invention provides a method for a terminal device to receive broadcasting channels, including the following steps: detecting and receiving signals; demultiplexing a broadcasting signal from the corresponding OFDM symbols to obtain the broadcasting signal transmitted on the P-BCH channel, wherein the corresponding OFDM symbols do not bear thereon any of the following signals: CSI-RS or synchronous signals; and acquiring broadcasting information based on the broadcasting signal.

In some embodiments of the present invention, the above method is applied in an FDD or a TDD communication system.

In one embodiment of the present invention, the corresponding OFDM symbols are symbols without the following features: all the OFDM symbols that can be used for bearing CSI-RS in either of communication systems, or OFDM symbols that can be used for bearing CSI-RS in both communication systems.

In one embodiment of the present invention, OFDM symbols, except for the one in the sub-frame for transmitting CSI-RS and synchronous channel, are used for demultiplexing to obtain P-BCH channel.

In one embodiment of the present invention, P-BCH channel is obtained by demultiplexing in any of the following modes: for a normal CP sub-frame, P-BCH occupies OFDM symbols 0, 3, 4 of the first time slot and OFDM symbols 0, 1, 4 of the second time slot; for an extended CP sub-frame structure, P-BCH occupies OFDM symbols 0, 3 of the first time slot and OFDM symbols 0, 1, 2, 3 of the second time slot; for an extended CP sub-frame structure, P-BCH occupies OFDM symbols 0, 1, 2, 3 of the first time slot and OFDM symbols 0, 3 of the second time slot; for a normal CP sub-frame, P-BCH occupies OFDM symbols 0, 1, 3, 4 of the first time slot and OFDM symbols 0, 4 of the second time slot; and for an extended CP sub-frame structure, P-BCH occupies OFDM symbols 0, 1, 3 of the first time slot, and OFDM symbols 0, 2, 3 of the second time slot.

In one embodiment of the present invention, the P-BCH channel resulting from demultiplexing has one or more of the following features: the number of the occupied sub-carriers being smaller than the number of sub-carriers of six PRBs, and being the number of sub-carriers of integral number of PRBs; occupying PRB resource in the middle of the frequency band; and the PRB resource at both ends of the frequency resource of the 6 PRBs in the middle of the frequency band being used for transmitting the P-BCH channel.

Based on the above principle(s) of design, three examples of configuration of P-BCH according to embodiments of the present invention are described below. In the following description, the P-SCH and OFDM symbols occupied by the P-SCH are examples which only serve to explain the invention rather than limit use of the P-BCH mapping structure according to other embodiments of the present invention to only such a P-SCH and a mapping structure thereof.

Example 3

In NCT system, for each P-BCH burst, this embodiment of the present invention guarantees that the number of REs for transmitting P-BCH approximates or equals the number of REs in the current LTE system. In other words, the NCT system of this embodiment remains consistent with the current LTE system; as to the NCT system, P-BCH may be transmitted on four OFDM symbols. Some of the REs in the four OFDM symbols may be used for other purposes, such as bearing TRS, but the REs that serve other purposes will not be used for bearing P-BCH. Here, P-BCH mapping structures may be designed separately and respectively for FDD and TDD systems; alternatively, the same P-BCH mapping structure may be adopted by FDD and TDD systems so as to increase consistency.

Figure 10:
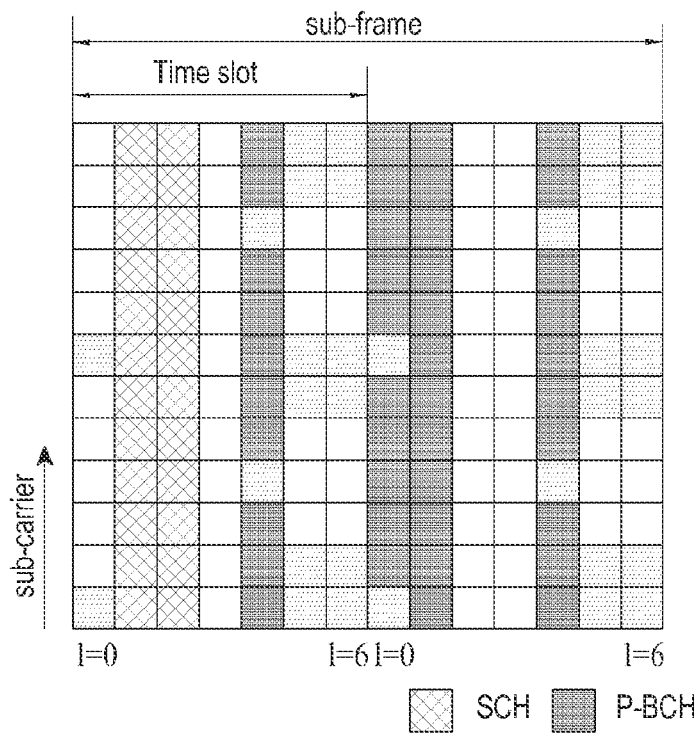
FIG. 10 is a mapping diagram of P-BCH according to an embodiment of the present invention, as discussed in reference to Example 3.

According to the design of the current LTE system, for a normal CP sub-frame structure of FDD system, OFDM symbols 5, 6 of the first time slot and OFDM symbols 2, 3, 5, 6 of the second time slot may be used for transmitting CSI-RS. As shown by FIG. 10, in this embodiment, it is further assumed that P-SCH and S-SCH are transmitted by occupying OFDM symbols 1 and 2 of the first time slot of a sub-frame. To improve estimated accuracy of channels of REs occupied by P-BCH, P-BCH can be configured to occupy OFDM symbols as close as possible to OFDM symbols occupied by DMRS, and channel estimation using extrapolation should be avoided as far as possible. As shown by FIG. 10, P-BCH occupies OFDM symbol 4 of the first time slot and OFDM symbols 0, 1, 4 of the second time slot. The P-BCH mapping structure can be applied to FDD system; alternatively, the P-BCH mapping structure can be simultaneously applied to FDD and TDD systems of NCT, as it avoids conflicts between P-BCH and common CSI-RS resources in FDD and TDD systems.

Figure 11:
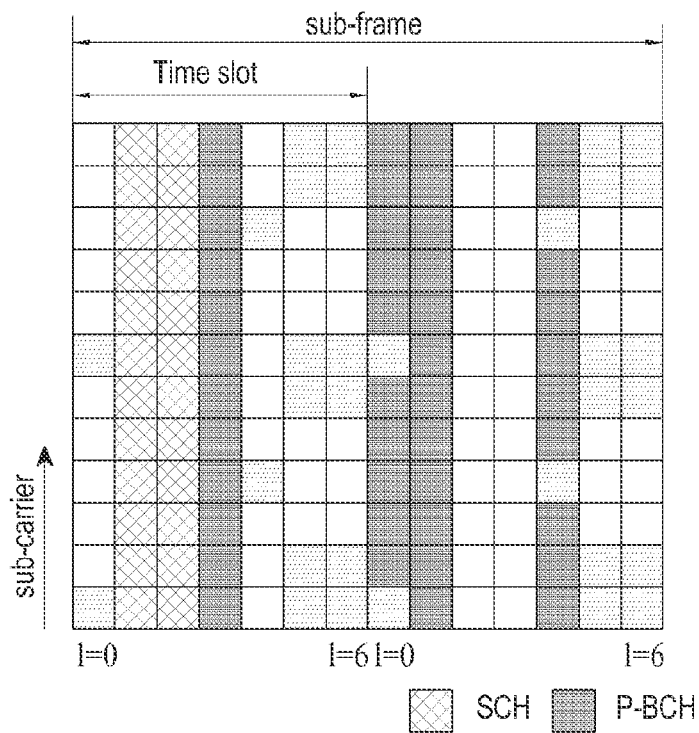
FIG. 11 is a mapping diagram of P-BCH according to an embodiment of the present invention, as discussed in reference to Example 3.

Alternatively, transmission of P-BCH on the OFDM symbols that transmit TRS is avoided as far as possible, so as to prevent contiguous TRS and P-BCH of NCT cells from interfering with one another. For example, the P-BCH as shown by FIG. 11 occupies OFDM symbol 3 of the first time slot and OFDM symbols 0, 1, 4 of the second time slot. The P-BCH mapping structure minimizes transmission of the P-BCH on OFDM symbols with TRS; it can be applied to FDD system, or simultaneously applied to FDD and TDD systems of NCT, as it avoids conflicts between P-BCH and all possible common CSI-RS resources of FDD and TDD systems.

Figure 12:
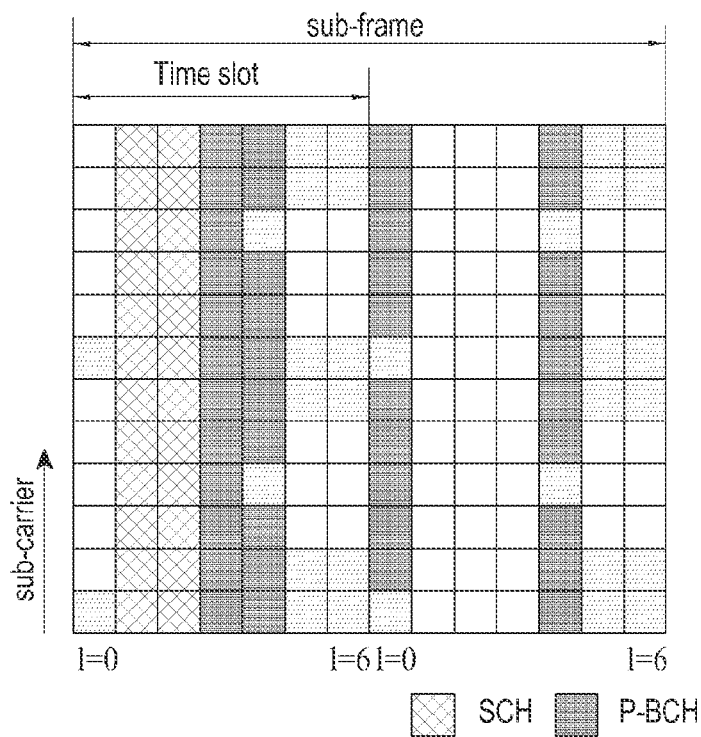
FIG. 12 is a mapping diagram of P-BCH according to an embodiment of the present invention, as discussed in reference to Example 3.

Alternatively, considering that OFDM symbol 1 of the second time slot of a sub-frame may be used for transmitting CSI-RS in TDD system, such OFDM symbol will not be used for P-BCH transmission, in that case, as shown by FIG. 12, the P-BCH occupies OFDM symbols 3, 4 of the first time slot and OFDM symbols 0, 4 of the second time slot. The P-BCH mapping structure can be applied to TDD system, or simultaneously applied to FDD and TDD systems of NCT, as it avoids conflicts between P-BCH, and all possible CSI-RS resources for FDD and TDD systems.

Figure 13:
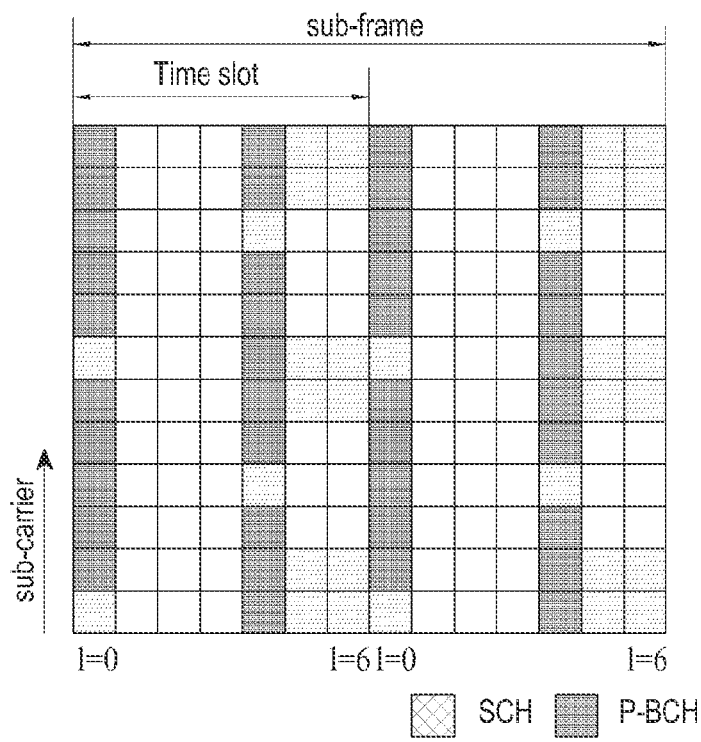
FIG. 13 is a mapping diagram of P-BCH according to an embodiment of the present invention, as discussed in reference to Example 3.

Alternatively, as shown by FIG. 13, the P-BCH may be mapped to the four OFDM symbols that transmit TRS, i.e. the P-BCH occupies OFDM symbols 0, 4 of both time slots of a sub-frame. The mapping structure of the P-BCH can be simultaneously applied to FDD and TDD systems of NCT, as it avoids conflicts between of P-BCH and all possible CSI-RS resources of FDD and TDD systems. The principle of design as shown by FIG. 13 is likewise suitable for the extended CP sub-frame structure, so as to increase the consistency among standards.

As for the extended CP sub-frame structure, according to the design of the FDD system of the current LTE system, OFDM symbols 4, 5 of both slots can be used for transmitting CSI-RS. For this embodiment, it is further assumed that the P-SCH and the S-SCH are transmitted by respectively occupying OFDM symbols 1 and 2 of the first time slot of a sub-frame. To improve estimated accuracy of channel of REs occupied by P-BCH, P-BCH can be configured to occupy OFDM symbols as close as possible to OFDM symbols where DMRS resides, and channel estimation using extrapolation should be avoided as far as possible.

Figure 14:
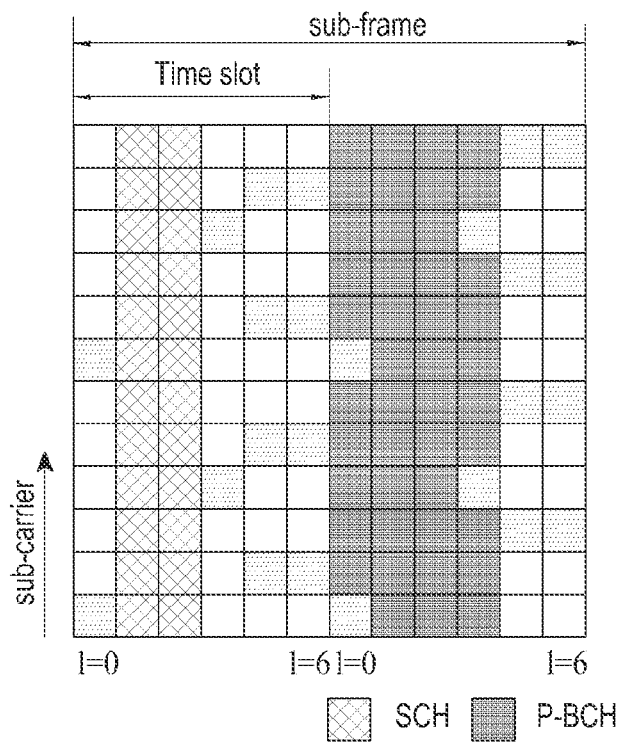
FIG. 14 is a mapping diagram of P-BCH according to an embodiment of the present invention, as discussed in reference to Example 3.
Figure 15:
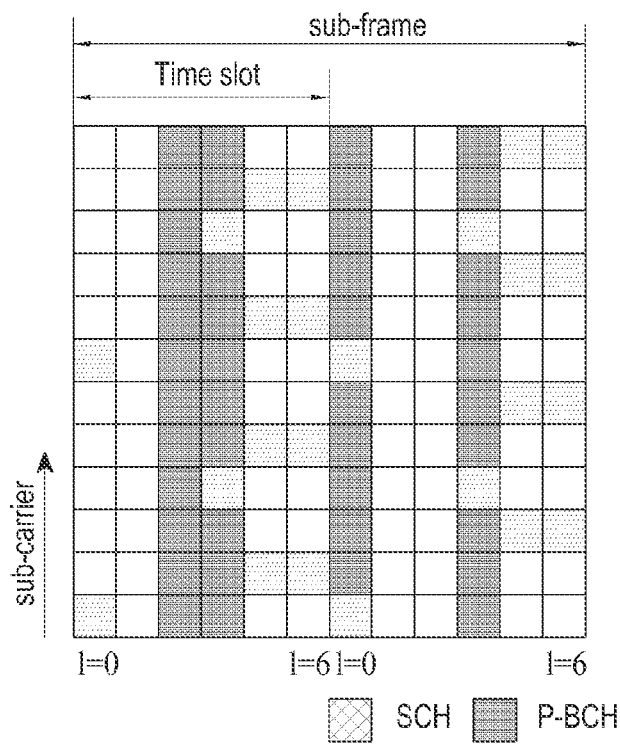
FIG. 15 is a mapping diagram of P-BCH according to an embodiment of the present invention, as discussed in reference to Example 3.
Figure 16:
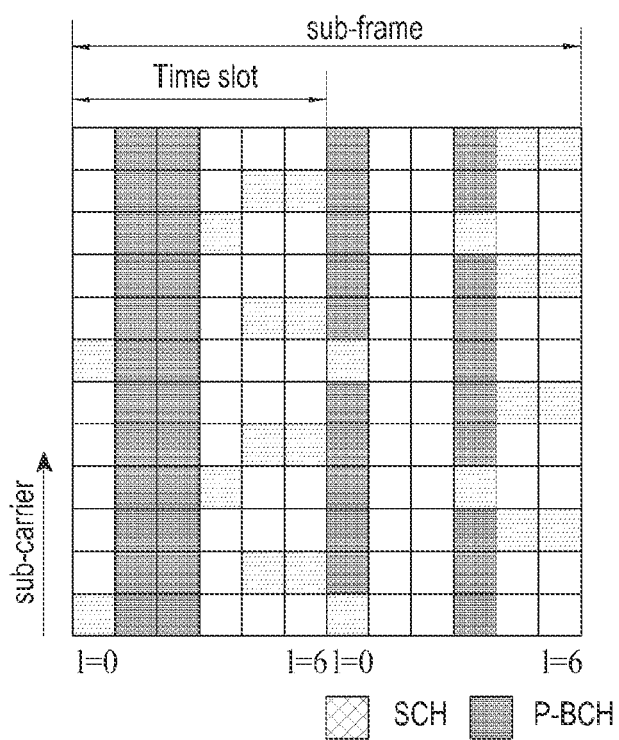
FIG. 16 is a mapping diagram of P-BCH according to an embodiment of the present 30 invention, as discussed in reference to Example 3.
Figure 17:
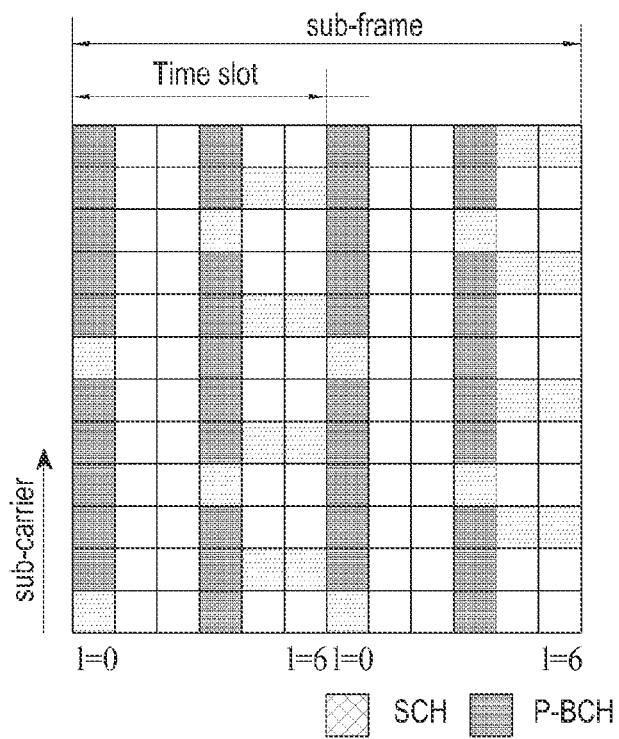
FIG. 17 is a mapping diagram of P-BCH according to an embodiment of the present invention, as discussed in reference to Example 3.

As shown by FIG. 14, P-BCH occupies OFDM symbols 0, 1, 2 and 3 of the second time slot. As for the TDD NCT system, assume that the P-SCH and the S-SCH are transmitted in DwPTS, and considering that OFDM symbols 1, 2 of the second time slot of a sub-frame can also be used for CSI-RS, for instance, P-BCH of TDD system as shown by FIG. 15, occupies OFDM symbols 2, 3 of the first time slot and OFDM symbols 0, 3 of the second time slot. Alternatively, it avoids transmission of P-BCH on the OFDM symbols that transmit TRS as far as possible, so as to refrain contiguous between TRS and P-BCH of NCT cells from interfering one another. For example, P-BCH as shown by FIG. 16 occupies OFDM symbols 1, 2 of the first time slot and OFDM symbols 0, 3 of the second time slot. Alternatively, for example, P-BCH as shown by FIG. 17 occupies OFDM symbols 0, 3 of two slots.

For the purpose of ensuring consistency of the system so as to reduce complexity of UE, the P-BCH mapping structure in FIG. 14 may be simultaneously applied to FDD and TDD system of NCT, so as to avoid conflicts between P-BCH and the common CRI-RS of FDD and TDD. Alternatively, the P-BCH mapping structure as shown by FIG. 17 can also be simultaneously applied to FDD and TDD systems of NCT, so as to avoid conflicts between P-BCH and all possible CSI-RS resources of FDD and TDD systems.

Figure 18:
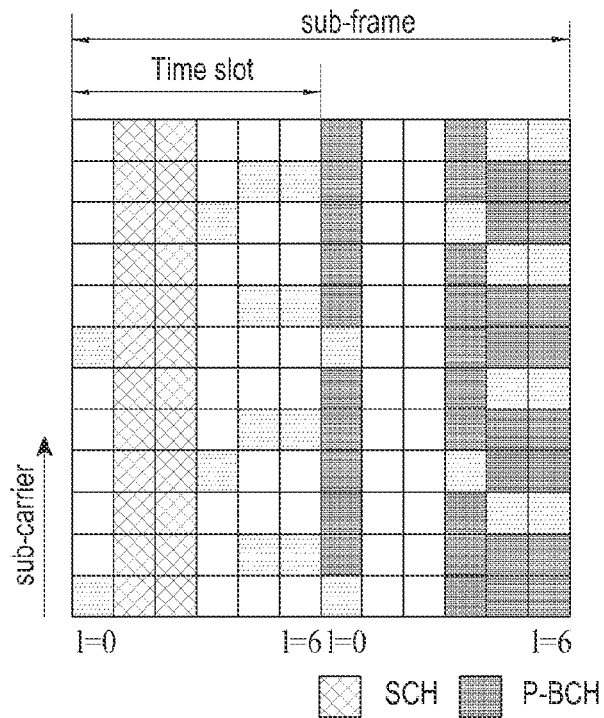
FIG. 18 is a mapping diagram of P-BCH according to an embodiment of the present invention, as discussed in reference to Example 3.

When the method of FIG. 14 is applied to both FDD and TDD systems, as OFDM symbols 1, 2 of the second time slot are occupied by P-BCH, as a result, TDD loses part of available CSI-RS resources. To address such problem, an embodiment of the present invention provides an improved method: extending CSI-RS resources on OFDM symbols 1, 2 of the second time slot to the application in FDD system, then applying some OFDM symbols that carry DMRS and CSI-RS to P-BCH. Treatment as such actually increases the capacity of CSI-RS on the basis of FIG. 14, so as to increase the flexibility in configuring CSI-RS. For example, as shown by FIG. 18, FDD and TDD systems are configured to transmit CSI-RS using OFDM symbols 1, 2 of the second time slot, and P-BCH is configured to occupy OFDM symbols 0, 3, 4, 5 of the second time slot.

Figure 19:
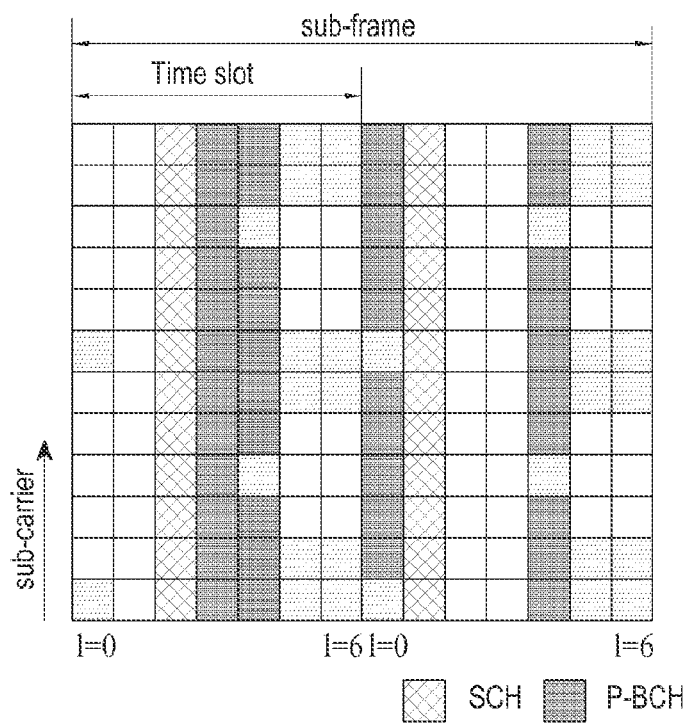
FIG. 19 is a mapping diagram of P-BCH according to an embodiment of the present invention, as discussed in reference to Example 3.
Figure 20:
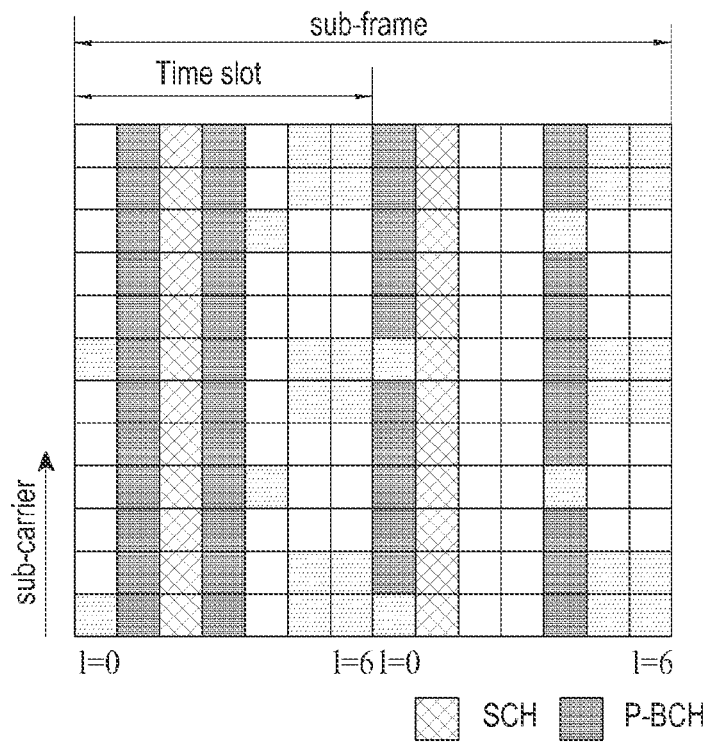
FIG. 20 is a mapping diagram of P-BCH according to an embodiment of the present invention, as discussed in reference to Example 3.

Further, for a normal CP sub-frame structure, assume that P-SCH and S-SCH are transmitted by respectively occupying OFDM symbol 2 of the first time slot and OFDM symbol 1 of the second time slot in a sub-frame. To improve estimated accuracy of channels of REs occupied by P-BCH, P-BCH can be configured to occupy OFDM symbols as close as possible to OFDM symbols where DMRS resides, and channel estimation using extrapolation should be avoided as far as possible. As shown by FIG. 19, P-BCH occupies OFDM symbols 3, 4 of the first time slot and OFDM symbols 0, 4 of the second time slot. Alternatively, transmission of P-BCH on the OFDM symbols that transmit TRS are avoided as far as possible, so as to prevent contiguous TRS and P-BCH of NCT cells from interfering with one another. The P-BCH as shown by FIG. 20 occupies OFDM symbols 1, 3 of the first time slot and OFDM symbols 0, 4 of the second time slot; the P-BCH mapping structure as shown by FIG. 19 and FIG. 20 can be simultaneously applied to FDD and TDD systems of the NCT, so as to avoid conflicts between P-BCH, and all possible CSI-RS resources of FDD and TDD systems.

Figure 21:
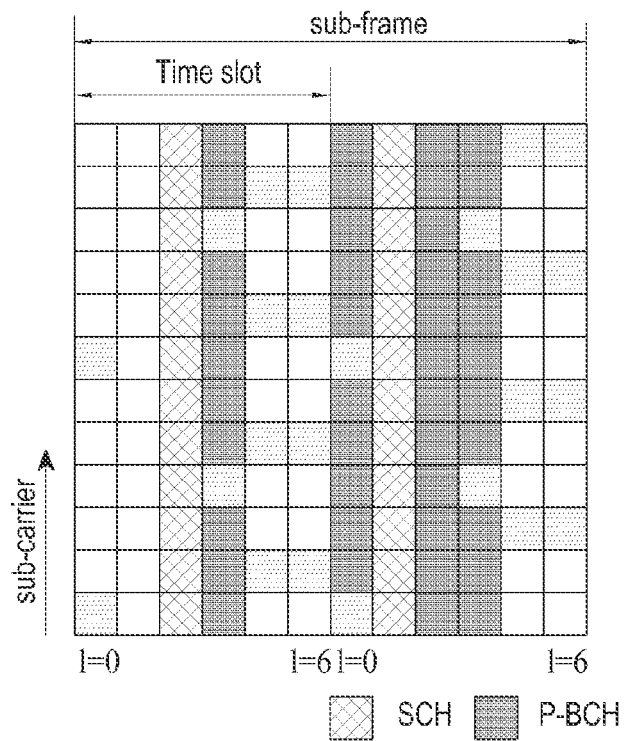
FIG. 21 is a mapping diagram of P-BCH according to an embodiment of the present invention, as discussed in reference to Example 3.
Figure 22:
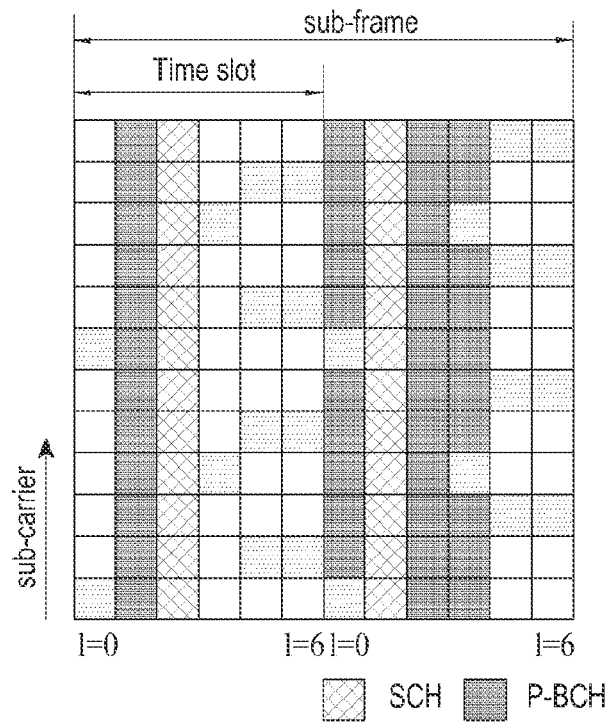
FIG. 22 is a mapping diagram of P-BCH according to an embodiment of the present invention, as discussed in reference to Example 3.

For an extended CP sub-frame structure, it is further assumed that P-SCH and S-SCH are transmitted by respectively occupying OFDM symbol 2 of the first time slot and OFDM symbol 1 of the second time slot in a sub-frame. To improve estimated accuracy of channels of REs occupied by P-BCH, P-BCH can be configured to occupy OFDM symbols as close as possible to OFDM symbols where DMRS resides, and channel estimation using extrapolation should be avoided as far as possible. As shown by FIG. 21, P-BCH occupies OFDM symbol 3 of the first time slot and OFDM symbols 0, 2, 3 of the second time slot. The P-BCH mapping structure can be simultaneously applied to FDD and TDD systems of NCT, so as to avoid conflicts between P-BCH and common CSI-RS resources of FDD and TDD systems. Alternatively, transmission of the P-BCH on the OFDM symbols that transmit TRS are avoided as far as possible, so as to prevent contiguous TRS and P-BCH of NCT cells from interfering with one another. The P-BCH as shown by FIG. 22 occupies OFDM symbol 1 of the first time slot and OFDM symbols 0, 2, 3 of the second time slot. The P-BCH mapping structure can also be simultaneously applied to FDD and TDD systems of NCT, so as to avoid conflicts between P-BCH and all possible CSI-RS resources of FDD and TDD systems, and to minimize, for FDD system, transmission of P-BCH on OFDM symbols that comprise TRS.

Example 4

To enhance the reliability of P-BCH, OFDM symbols except for the OFDM symbols for transmitting CSI-RS and synchronous channel, are used for transmitting P-BCH. In fact, the accuracy of channel estimation based on DMRS is lower than the accuracy of channel estimation based on CRS of the current LTE system. The method according to this embodiment of the present invention enables the number of REs of each P-BCH burst to exceed the number of REs of the current LTE system, so as to ensure the transmission performance of P-BCH in NCT system. If P-BCH mapping structures are separately and respectively designed for FDD and TDD systems, as the mapping positions of P-SCH and S-SCH in the two systems are different, based on the above principle, the mapping structures of P-BCH in FDD and TDD are often different. In addition, at least a part of signals of synchronous channels are likely transmitted in DwPTS in TDD system, so that there will be more OFDM symbols used for mapping P-BCH in a normal sub-frame. Alternatively, the same P-BCH mapping structure can be used in FDD and TDD systems in order to boost consistency. Here, OFDM symbols for transmitting P-BCH in a normal sub-frame of TDD system is generally more than those in FDD system, thus, according to the FDD sub-frame structure, OFDM symbols, except for the OFDM symbols used for CSI-RS and synchronous channels, are designed for transmitting P-BCH, which can be extended to TDD system, for which, all the other OFDM symbols, except for the OFDM symbols used for CSI-RS and synchronous channels, have never been used for transmitting P-BCH.

Figure 23:
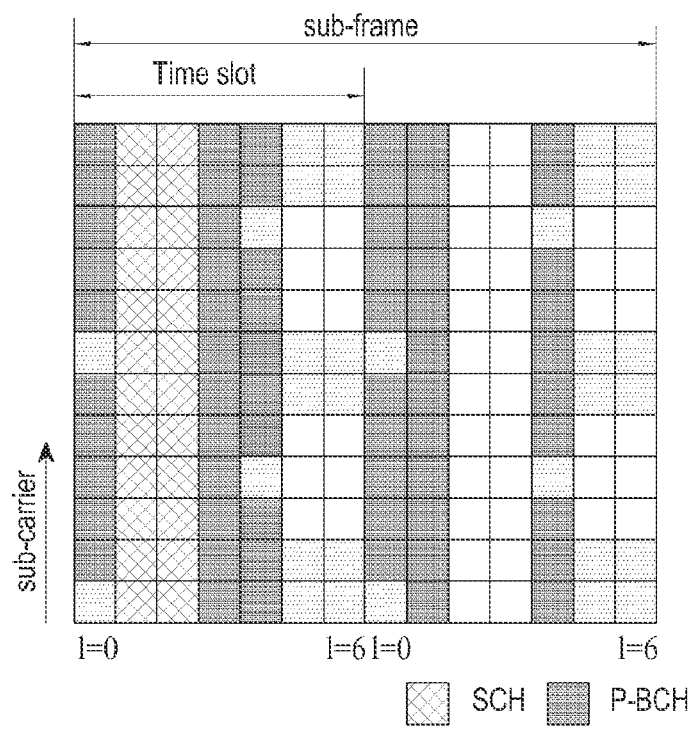
FIG. 23 is a mapping diagram of P-BCH according to an embodiment of the present invention, as discussed in reference to Example 4.

For a normal CP sub-frame according to the design of the current LTE FDD system, OFDM symbols 5, 6 of the first time slot and OFDM symbols 2, 3, 5, 6 of the second time slot can be used for transmitting CSI-RS; it is further assumed that P-SCH and S-SCH are transmitted by occupying OFDM symbols 1 and 2 of the first time slot in a sub-frame, as shown by FIG. 23, P-BCH occupies OFDM symbols 0, 3, 4 of the first time slot and OFDM symbols 0, 1, 4 of the second time slot.

Figure 24:
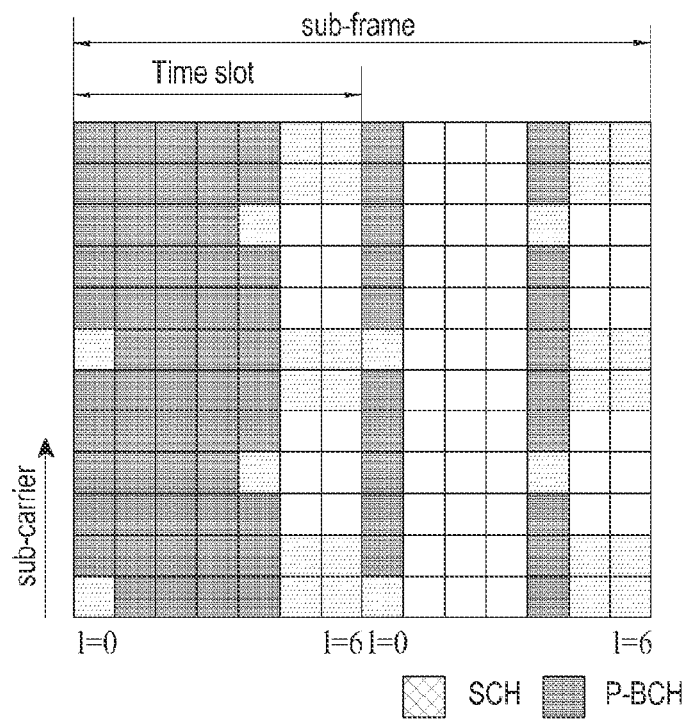
FIG. 24 is a mapping diagram of P-BCH according to an embodiment of the present 15 invention, as discussed in reference to Example 4.

As for the TDD NCT system, assume that P-SCH and S-SCH are transmitted in DwPTS, and considering that OFDM symbol 1 of the second time slot of a sub-frame can also be used for CSI-RS, then P-BCH of TDD system as shown by FIG. 24, occupies OFDM symbols 0, 1, 2, 3, 4 of the first time slot and OFDM symbols 0, 4 of the second time slot. If avoidance of conflicts between P-BCH and the common CSI-RS of FDD and TDD is pursued only, then OFDM symbol 1 of the second time slot of a sub-frame can likewise be used for bearing P-BCH, i.e. P-BCH of TDD system occupies OFDM symbols 0, 1, 2, 3, 4 of the first time slot and OFDM symbols 0, 1, 4 of the second time slot.

Figure 25:
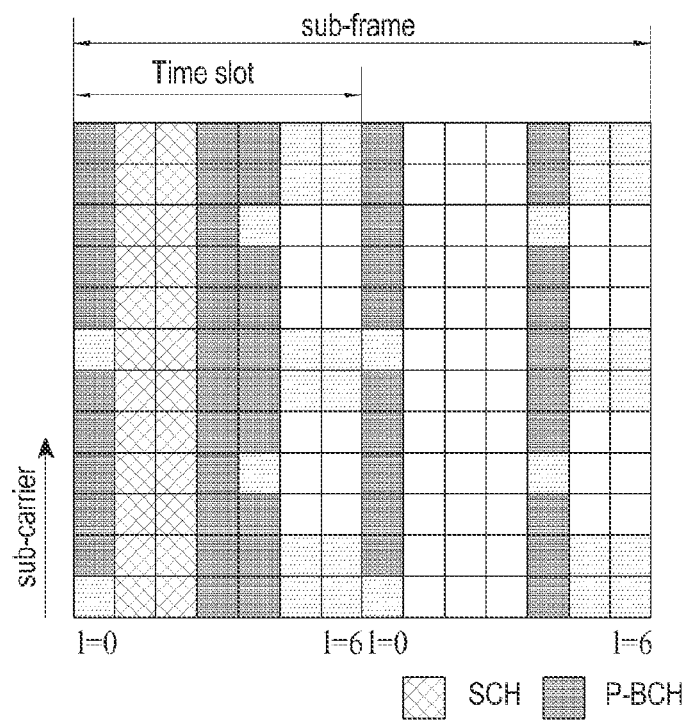
FIG. 25 is a mapping diagram of P-BCH according to an embodiment of the present invention, as discussed in reference to Example 4.

For the purpose of ensuring consistency of the system so as to reduce complexity of UE, the P-BCH mapping structure in FIG. 23 may be simultaneously applied to FDD and TDD systems of NCT, which assures the P-BCH and the common CRI-RS of FDD and TDD are without conflicts. When OFDM symbol 1 of the second time slot of a sub-frame is used for transmitting CSI-RS in the TDD system, such OFDM will not be used for P-BCH transmission. In that case, as shown by FIG. 25, P-BCH occupies OFDM symbols 0, 3, 4 of the first time slot and OFDM symbols 0, 4 of the second time slot. The P-BCH mapping structure can also be applied simultaneously to FDD and TDD system of NCT.

Figure 26:
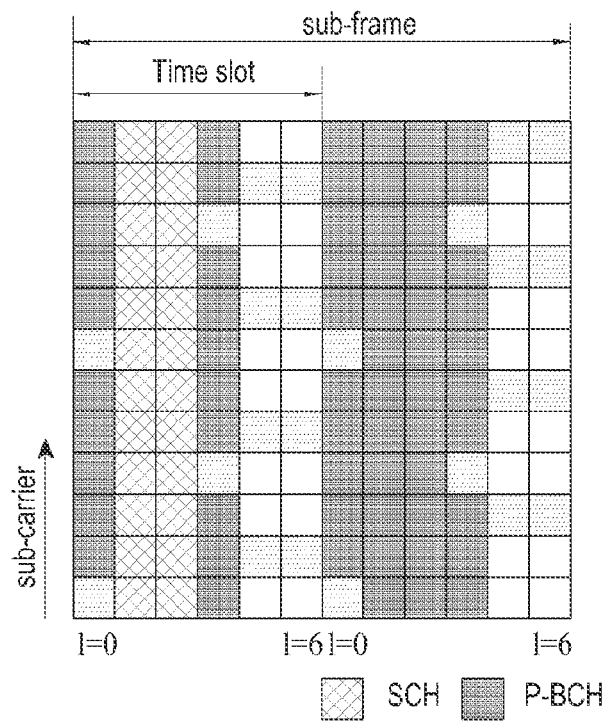
FIG. 26 is a mapping diagram of P-BCH according to an embodiment of the present invention, as discussed in reference to Example 4.

For the extended CP sub-frame structure, according to the design of the current LTE system, as to the FDD system, OFDM symbols 4, 5 of both slots can be used for transmitting CSI-RS. As shown by FIG. 26, it is further assumed that P-SCH and S-SCH are transmitted by occupying OFDM symbols 1 and 2 of the first time slot of a sub-frame. P-BCH occupies OFDM symbol 3 of the first time slot and OFDM symbols 0, 1, 2, 3 of the second time slot.

Figure 27:
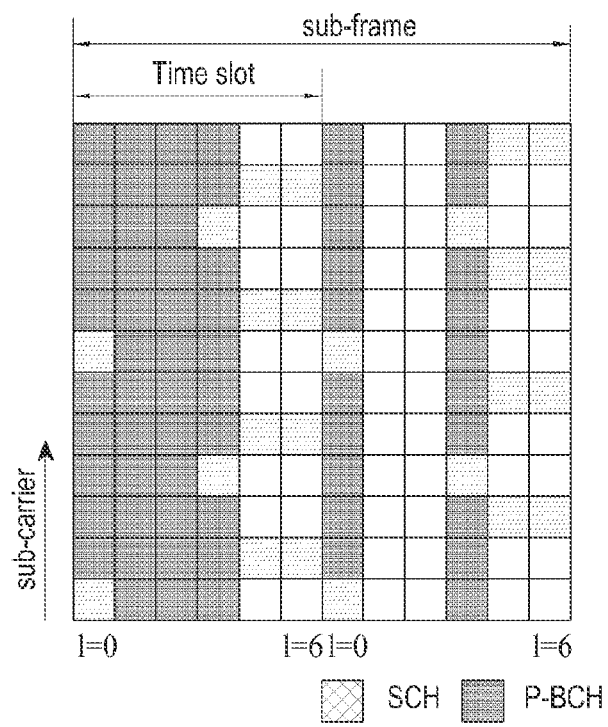
FIG. 27 is a mapping diagram of P-BCH according to an embodiment of the present invention, as discussed in reference to Example 4.

As for the TDD NCT system, assume that P-SCH and S-SCH are transmitted in DwPTS, and considering that OFDM symbols 1, 2 of the second time slot of a sub-frame can also be used for CSI-RS, then the P-BCH of the TDD system as shown by FIG. 27, occupies OFDM symbols 0, 1, 2, 3 of the first time slot and OFDM symbols 0, 3 of the second time slot. If avoidance of conflicts between P-BCH and the common CSI-RS of FDD and TDD is the only goal, then OFDM symbols 1, 2 of the second time slot of a sub-frame can likewise be used for bearing P-BCH, i.e. P-BCH of TDD system occupies OFDM symbols 0, 1, 2, 3 of the first time slot and OFDM symbols 0, 1, 2, 3 of the second time slot.

For the purpose of ensuring consistency of the system so as to reduce complexity of UE, the P-BCH mapping structure in FIG. 26 may be simultaneously applied to FDD and TDD system of NCT, which assures the P-BCH and the common CRI-RS of FDD and TDD are without conflicts. In fact, even if FDD and TDD employ the methods of FIG. 26 and FIG. 27 respectively, as the numbers of REs for P-BCH in the two systems are the same, the consistency between FDD and TDD can also be guaranteed to some extent.

Figure 28:
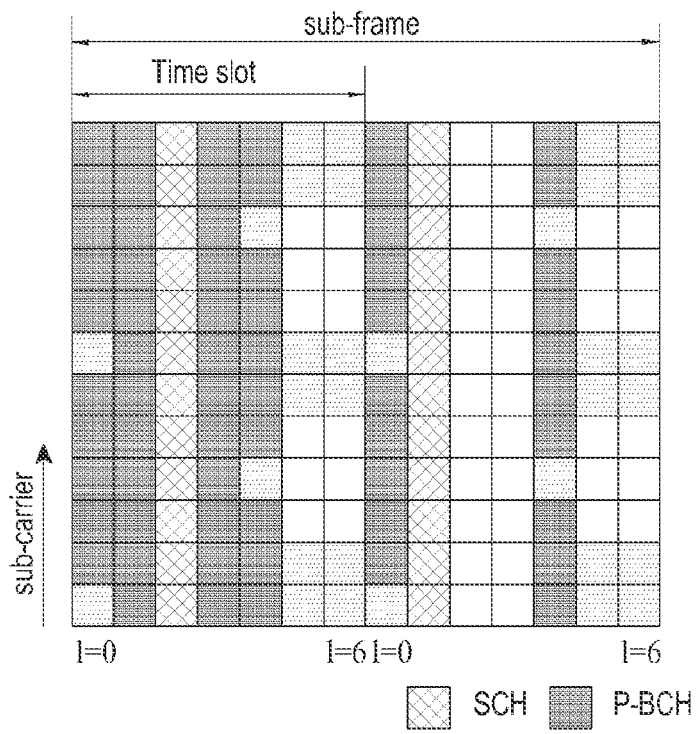
FIG. 28 is a mapping diagram of P-BCH according to an embodiment of the present invention, as discussed in reference to Example 4.
Figure 29:
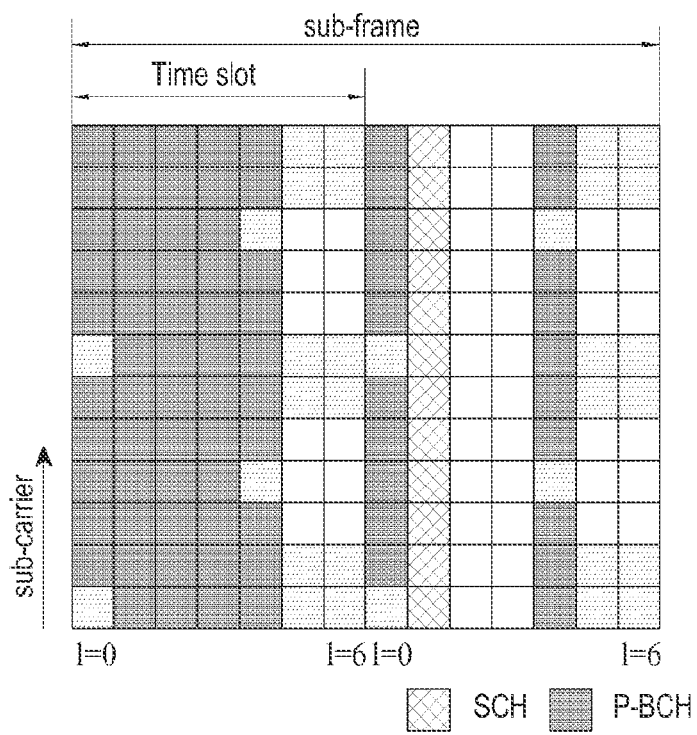
FIG. 29 is a mapping diagram of P-BCH according to an embodiment of the present 25 invention, as discussed in reference to Example 4.

Alternatively, for FDD system, and for a normal CP sub-frame, assume that P-SCH and S-SCH are transmitted by occupying OFDM symbol 2 of the first time slot and OFDM symbol 1 of the second time slot of a sub-frame, as shown by FIG. 28, P-BCH occupies OFDM symbols 0, 1, 3, 4 of the first time slot, and OFDM symbols 0, 4 of the second time slot. As for the TDD NCT system, assume that only OFDM symbol 1 of the second time slot in a normal sub-frame is used for bearing a synchronous channel, then as shown by FIG. 29, P-BCH of TDD system, occupies OFDM symbols 0, 1, 2, 3, 4 of the first time slot and OFDM symbols 0, 4 of the second time slot. For the purpose of ensuring consistency of the system so as to reduce complexity of UE, the P-BCH mapping structure in FIG. 28 may be simultaneously applied to FDD and TDD system of NCT, so as to avoid conflicts between P-BCH and all CRI-RSs of FDD and TDD.

Figure 30:
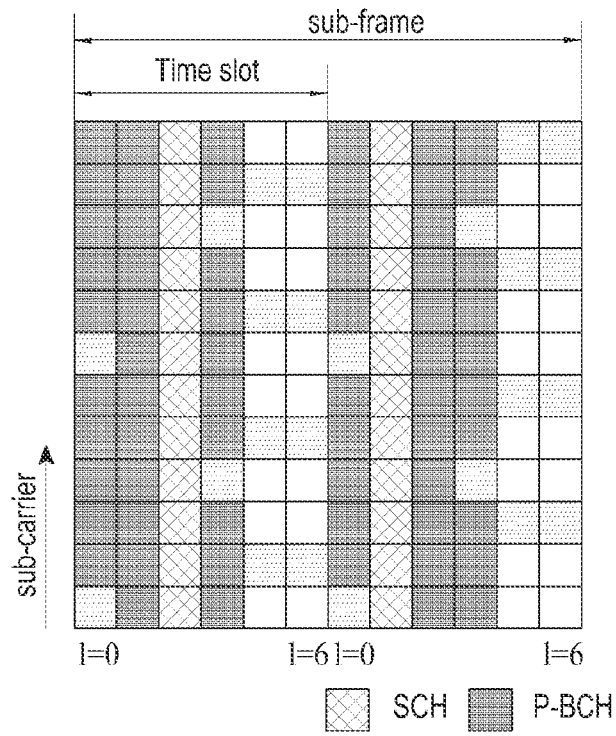
FIG. 30 is a mapping diagram of P-BCH according to an embodiment of the present invention, as discussed in reference to Example 4.
Figure 31:
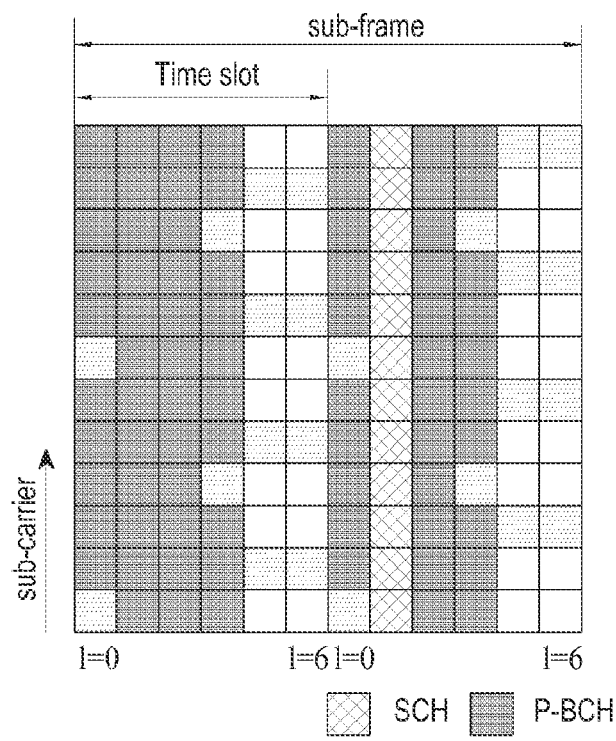
FIG. 31 is a mapping diagram of P-BCH according to an embodiment of the present invention, as discussed in reference to Example 5.

For an extended CP sub-frame structure, according to the design of the current LTE system, as for FDD system, OFDM symbols 4, 5 of both slots can be used for transmitting CSI-RS. As shown by FIG. 30, it is further assumed in this embodiment that P-SCH and S-SCH are transmitted by respectively occupying OFDM symbol 2 of the first time slot and OFDM symbol 1 of the second time slot of a sub-frame; the P-BCH occupies OFDM symbols 0, 1, 3 of the first time slot and OFDM symbols 0, 2, 3 of the second time slot. As for the TDD NCT system, assume that only OFDM symbol 1 of the second time slot in a normal sub-frame is used for bearing a synchronous channel, then as shown by FIG. 31, P-BCH of TDD system, occupies OFDM symbols 0, 1, 2, 3 of the first time slot and OFDM symbols 0, 2, 3 of the second time slot, so that conflicts between P-BCH and the pubic CSI-RS of FDD and TDD in TDD system are avoided. For the purpose of ensuring consistency of the system so as to reduce complexity of UE, the P-BCH mapping structure in FIG. 30 may be simultaneously applied to FDD and TDD system of NCT, so as to avoid conflicts between P-BCH and all CRI-RSs of FDD and TDD.

Example 5

Figure 32:
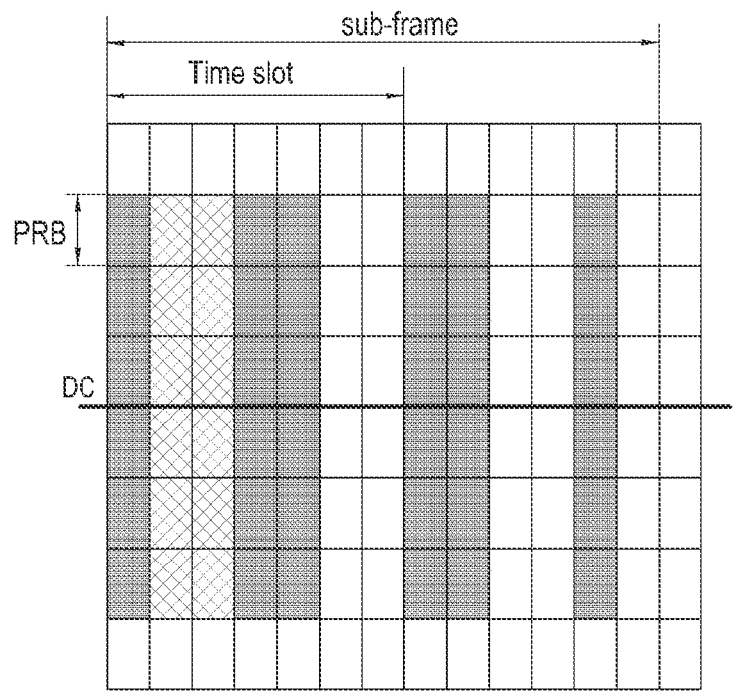
FIG. 32 is a mapping diagram of P-BCH according to an embodiment of the present invention, as discussed in reference to Example 5.

Example 4 describes a method of transmitting P-BCH using as many OFDM symbols in a sub-frame as possible. Such method can enhance link performance of each P-BCH burst. As shown by FIG. 32, P-BCH can still be transmitted on 72 sub-carriers in the middle of the bandwidth (equivalent to 6 PRBs). However, the P-BCH resource allocating mechanism shown in FIG. 32 may cause performance of P-BCH beyond the required performance. In this case, the number of sub-carriers occupied by P-BCH can be reduced, but the number of sub-carriers should be equivalent to an integral number of PRBs.

For instance, if the number of REs assigned to each P-BCH, which is close or equal to that of the current LTE system, has already satisfied detection performances of P-BCH, then the number of PRB pairs assigned for P-BCH can be reduced. Assume that each P-BCH burst is transmitted by mapping to 6 OFDM symbols in a sub-frame, then P-BCH only needs to be mapped to 48 sub-carriers (equivalent to 4 PRBs) to ensure that the sum of REs for P-BCH is close to or equal to that of the current LTE system.

Figure 33:
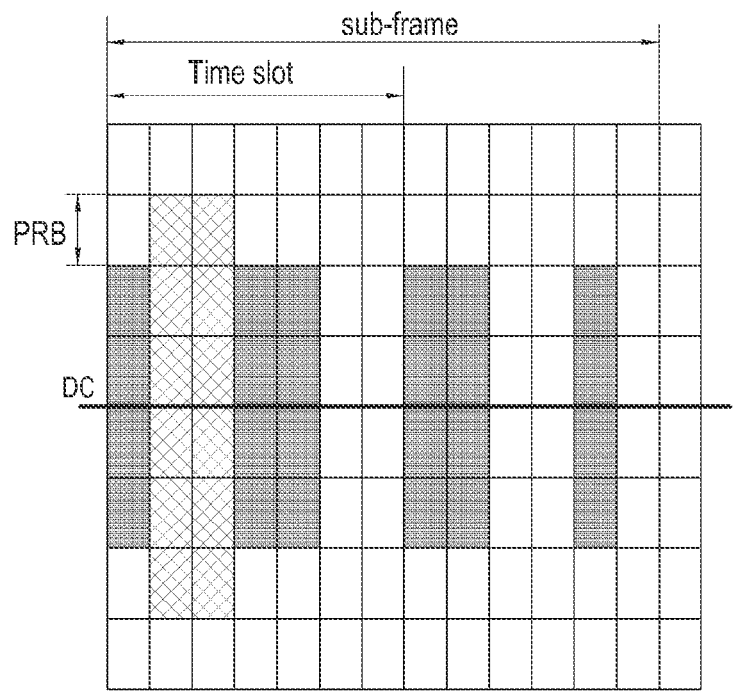
FIG. 33 is a mapping diagram of P-BCH according to an embodiment of the present invention, as discussed in reference to Example 5.
Figure 34:
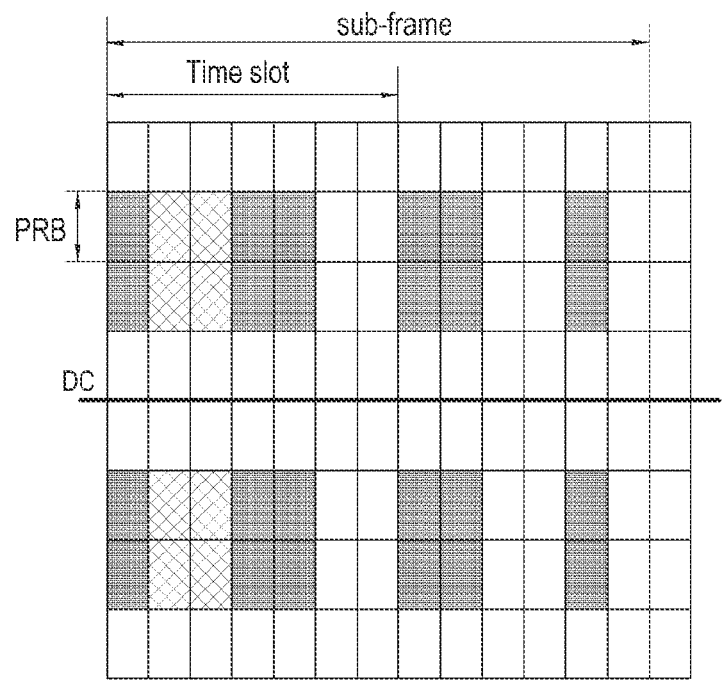
FIG. 34 is a mapping diagram of P-BCH according to an embodiment of the present invention, as discussed in reference to Example 5.
Figure 35:
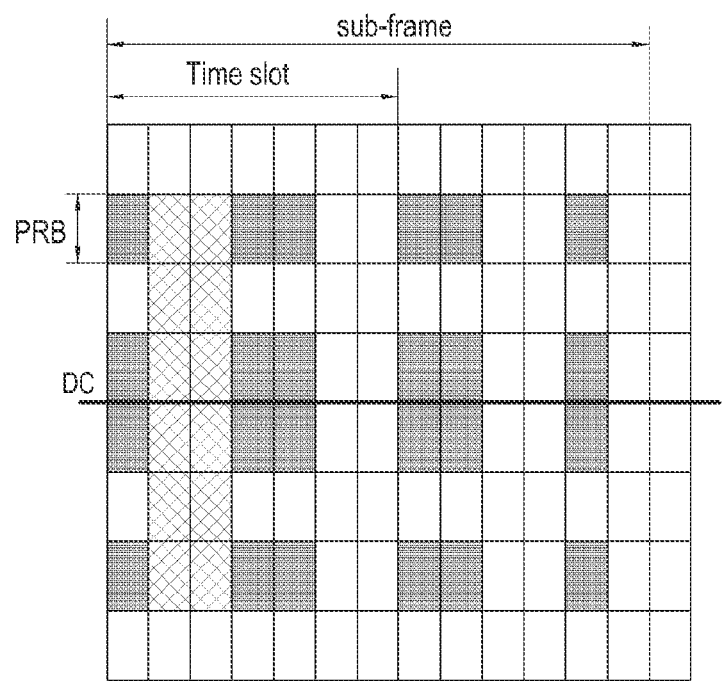
FIG. 35 is a mapping diagram of P-BCH according to an embodiment of the present invention, as discussed in reference to Example 5.

Assume that the number of sub-carriers occupied by P-BCH equals the number of sub-carriers of N PRBs, and N is smaller than 6. Resources equal to N PRBs in the middle of the bandwidth can be allocated to P-BCH's occupation. For example, as shown by FIG. 33, P-BCH occupies sub-carriers which equal to 4 PRBs in the middle of the bandwidth or frequency resources occupied by P-BCH in units of PRBs are dispersed to resources which equal 6 PRBs in the middle of the bandwidth, and the PRB resources at both ends of the frequency resources of 6 PRBs in the middle of the bandwidth is ensured to be used for P-BCH transmission, so as to guarantee the frequency diversity performance. For example, as shown by FIG. 34, P-BCH occupies two consecutive sub-carriers on frequency resources, which equal 6 PRBs, in the middle of the bandwidth, or as shown by FIG. 35, P-BCH occupies three consecutive sub-carriers on frequency resources, which equal 6 PRBs, in the middle of the bandwidth.

Equipment which can perform the above methods in accordance with embodiments of the present invention will be described below.

Figure 36:
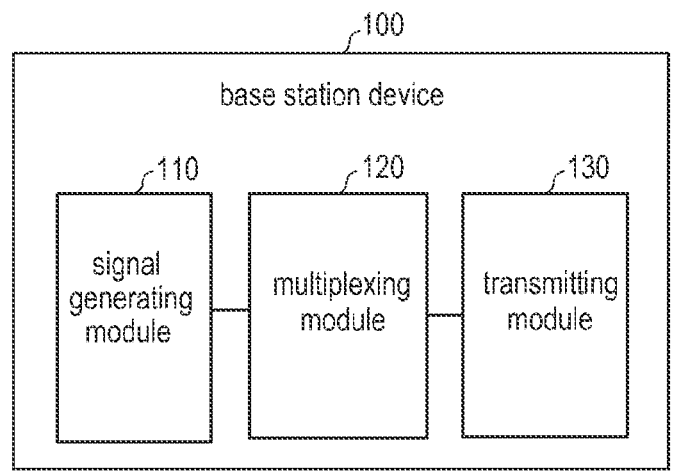
FIG. 36 is a structural schematic diagram of a base station device for transmitting a synchronous channel according to an embodiment of the present invention.

FIG. 36 is a structural schematic diagram of a base station device for transmitting synchronous channel signals according to an embodiment of the present invention, comprising a signal generating module 110, a multiplexing module 120 and a transmitting module 130. The signal generating module 110 is used for generating a synchronous signal transmitted on the P-SCH and the S-SCH channels. Multiplexing module 120 is used for multiplexing synchronous signals to specific OFDM symbols to form P-SCH and S-SCH channels, wherein, the specific OFDM symbols do not bear thereon any of the following signals: DMRS, CSI-RS or TRS. The transmitting module 130 is used for transmitting P-SCH and S-SCH channels.

The base station device may be applied in an FDD or TDD communication system, where P-SCH and S-SCH have the same relative positions in the two communication systems.

In one embodiment of the above base station device 100, the multiplexing module 120 maps P-BCH and S-SCH channels in a TDD communication system in any of the following modes including: OFDM symbol 0 of DwPTS bears P-SCH channel, OFDM symbol 1 of the second time slot in the previous sub-frame of DwPTS bears S-SCH channel; and/or the previous two OFDM symbols of DwPTS respectively transmit P-SCH and S-SCH channels.

In one embodiment of the above base station device 100, the multiplexing module 120 maps P-BCH and S-SCH channels in an FDD communication system in any of the following modes including: OFDM symbol 0 of a sub-frame bears P-SCH channel, OFDM symbol 2 of the first time slot in the previous sub-frame bears S-SCH channel; and/or OFDM symbols 1 and 2 of the first time slot in the sub-frame respectively transmit P-SCH and S-SCH channels.

In one embodiment of the base station device 100, the specific OFDM symbols are symbols without the following features: all the OFDM symbols that can be used for bearing CSI-RS in either of communication systems, or OFDM symbols that can be used for bearing CSI-RS in both communication systems.

Figure 37:
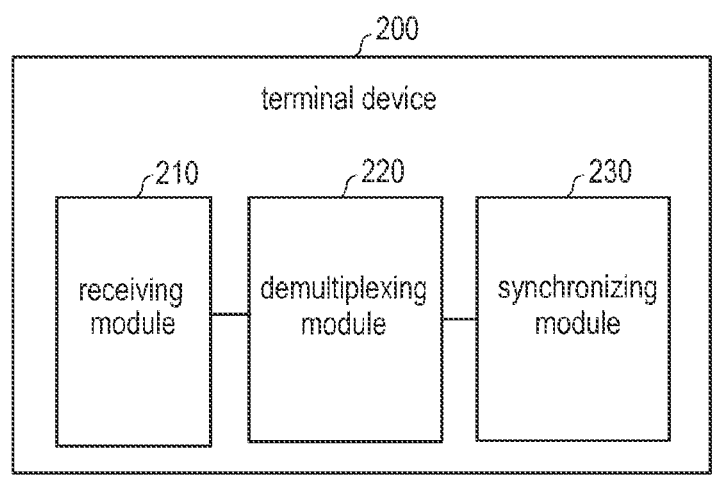
FIG. 37 is a structural schematic diagram of a UE device for receiving a synchronous channel according to an embodiment of the present invention.

FIG. 37 is a structural schematic diagram of a UE device for receiving synchronous channels according to an embodiment of the present invention, comprising: a receiving module 210, a demultiplexing module 220 and a synchronizing module 230. The receiving module 210 is used for detecting and receiving signals. The demultiplexing module 220 is used for demultiplexing the specific OFDM symbols to obtain synchronous signals of P-SCH and S-SCH channels, wherein, the specific OFDM symbols do not bear thereon any of the following signals: DMRS, CSI-RS or TRS. The synchronizing module 230 is used for carrying out system synchronization based on the synchronous signals.

In one embodiment of the terminal device 200, the system comprises an FDD or TDD communication system, and P-SCH and S-SCH have same relative positions in the two communication systems.

In one embodiment of the terminal device 200a demultiplexing module 220 obtains a synchronous signal, in a TDD communication system by demultiplexing from a specific OFDM symbol in any of the following modes including: obtaining a synchronous signal of P-SCH channel from OFDM symbol 0 of DwPTS, obtaining a synchronous signal of S-SCH channel from OFDM symbol 1 of the second time slot in the previous sub-frame of DwPTS; and/or obtaining respectively from synchronous signals of P-SCH and S-SCH channels the previous two OFDM symbols of DwPTS.

In one embodiment of the terminal device 200, a demultiplexing module 220 obtains a synchronous signal in an FDD communication system by demultiplexing from a specific OFDM symbol in any of the following modes including: obtaining a synchronous signal of P-SCH channel from OFDM symbol 1 of the second time slot in the sub-frame, obtaining a synchronous signal of S-SCH channel from OFDM symbol 2 of the first time slot; and/or obtaining synchronous signals of P-SCH and S-SCH channels respectively from OFDM symbols 1 and 2 of the first time slot in a sub-frame.

Figure 38:
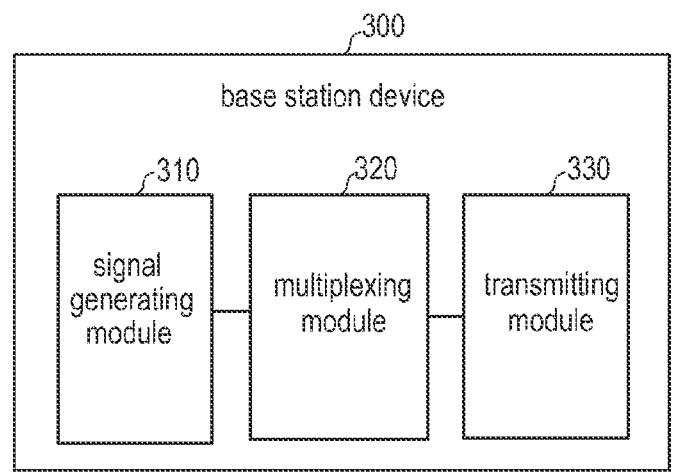
FIG. 38 is a structural schematic diagram of a base station device for transmitting P-BCH according to an embodiment of the present invention.

FIG. 38 is a structural schematic diagram of a base station device for transmitting P-BCH according to an embodiment of the present invention. The device comprises: a signal generating module 310, a multiplexing module 320 and a transmitting module 330. The signal generating module 310 is used for generating a broadcasting signal transmitted on P-BCH channel. The multiplexing module 320 is used for multiplexing the broadcasting signals to the corresponding OFDM symbols to form P-BCH, where the corresponding OFDM symbols do not bear any of the following signals: CSI-RS and synchronous signals. The transmitting module 330 is used for transmitting the P-BCH channel.

In one embodiment of the above base station device 300, the base station device is applied in an FDD or TDD communication system.

In one embodiment of the base station device 300, the corresponding OFDM symbols are symbols without the following features: all the OFDM symbols that can be used for bearing CSI-RS in either of communication systems, or OFDM symbols that can be used for bearing CSI-RS in both communication systems.

In one embodiment of the above base station device 300, the multiplexing module 320 used for forming a P-BCH channel is guided according to one or more of the following principles: for each burst of P-BCH channel, the number of REs for P-BCH transmission is determined by parameters of the current LTE system; OFDM symbol occupied by P-BCH channel is determined based on the OFDM symbol where DMRS resides; and/or P-BCH channel is mapped to four OFDM symbols that transmit TRS.

In one embodiment of the base station device 300, the multiplexing module 320 uses OFDM symbols except for the OFDM symbols in the sub-frame for transmitting CSI-RS and synchronous channel to transmit P-BCH channel.

In one embodiment of the above base station device 300, the multiplexing module 320 used for multiplexing P-BCH channel includes any of the following modes: for a normal CP sub-frame, P-BCH occupies OFDM symbols 0, 3, 4 of the first time slot, and OFDM symbols 0, 1, 4 of the second time slot; for an extended CP sub-frame structure, P-BCH occupies OFDM symbols 0, 3 of the first time slot, and OFDM symbols 0, 1, 2, 3 of the second time slot; for an extended CP sub-frame structure, P-BCH occupies OFDM symbols 0, 1, 2, 3 of the first time slot, and OFDM symbols 0, 3 of the second time slot; for a normal CP sub-frame, P-BCH occupies OFDM symbols 0, 1, 3, 4 of the first time slot, and OFDM symbols 0, 4 of the second time slot; and, for an extended CP sub-frame structure, P-BCH occupies OFDM symbols 0, 1, 3 of the first time slot, and OFDM symbols 0, 2, 3 of the second time slot.

In one embodiment of the above base station device 300, the multiplexing module 320 used for multiplexing P-BCH channel has one or more of the following features: the number of the occupied sub-carriers being smaller than the number of sub-carriers of 6PRBs, and being the number of sub-carriers of integral number of PRBs; PRB resource occupies the middle of the frequency band; and the PRB resource at both ends of the frequency resource of the 6 PRBs in the middle of the frequency band being used for transmitting the P-BCH channel.

Figure 39:
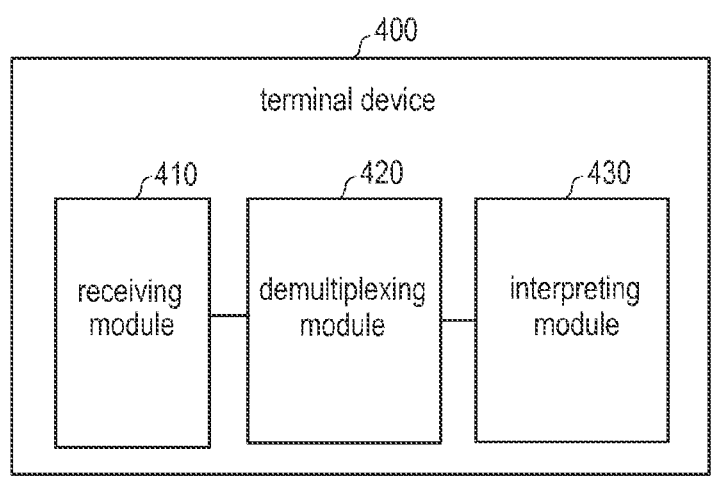
FIG. 39 is a structural schematic diagram of a UE device for receiving P-BCH according to an embodiment of the present invention.

FIG. 39 is a structural schematic diagram of a UE device for receiving P-BCH according to an embodiment of the present invention. The device comprises: a receiving module 410, a demultiplexing module 420 and an interpreting module 430. The receiving module 410 is used for detecting and receiving signals. The demultiplexing module 420 is used for demultiplexing a broadcasting signal from the corresponding OFDM symbols to obtain the broadcasting signal transmitted on the P-BCH channel, where the corresponding OFDM symbols do not bear any of the following signals: CSI-RS and synchronous signals. The interpreting module 430 is used for acquiring broadcasting information based on the broadcasting signal.

In one embodiment of the above terminal device 400, the terminal device 400 is applied to an FDD or TDD communication system.

In one embodiment of the terminal device 400, the corresponding OFDM symbols are symbols without the following features: all the OFDM symbols that can be used for bearing CSI-RS in either of communication systems, or OFDM symbols that can be used for bearing CSI-RS in both communication systems.

In one embodiment of the terminal device 400, OFDM symbols except for the OFDM symbols in the sub-frame for transmitting CSI-RS and synchronous channel, are used for demultiplexing in order to obtain the P-BCH channel.

In one embodiment of the above terminal device 400, the multiplexing module 420 is used for obtaining P-BCH channel in any of the following modes: for a normal CP sub-frame, P-BCH occupies OFDM symbols 0, 3, 4 of the first time slot, and OFDM symbols 0, 1, 4 of the second time slot; for an extended CP sub-frame structure, P-BCH occupies OFDM symbols 0, 3 of the first time slot, and OFDM symbols 0, 1, 2, 3 of the second time slot; for an extended CP sub-frame structure, P-BCH occupies OFDM symbols 0, 1, 2, 3 of the first time slot, and OFDM symbols 0, 3 of the second time slot; for a normal CP sub-frame, P-BCH occupies OFDM symbols 0, 1, 3, 4 of the first time slot, and OFDM symbols 0, 4 of the second time slot; and, for an extended CP sub-frame structure, P-BCH occupies OFDM symbols 0, 1, 3 of the first time slot, and OFDM symbols 0, 2, 3 of the second time slot.

In one embodiment of the above terminal device 400, the demultiplexing module 420 used for obtaining P-BCH channel has one or more of the following features: the number of the occupied sub-carriers being smaller than the number of sub-carriers of 6PRBs, and being the number of sub-carriers of integral number of PRBs; PRB resource occupies the middle of the frequency band; and the PRB resource at both ends of the frequency resource of the 6 PRBs in the middle of the frequency band being used for transmitting the P-BCH channel.

The embodiments described hereinabove are only examples of the present invention, which do not serve to limit the present invention. Thus, the present invention may be implemented with various modifications, substitutions, improvements, etc., without departing from the scope of the present invention. Everything falling within the scope of the following claims and their equivalents is included in the protective scope of this invention.

What is claimed is:

1. A method for transmitting a synchronous channel by a base station in a communication system, comprising:
    generating synchronous signals to be transmitted on a primary synchronous channel (P-SCH) and a secondary synchronous channel (S-SCH);
    mapping the synchronous signals except for reference signals to first orthogonal frequency division multiplexing (OFDM) symbols to form the P-SCH and the S-SCH;
    mapping the reference signals to second OFDM symbols different from the first OFDM symbols, the reference signals including a user-specific demodulation reference signal (DMRS), a channel state indication reference signal (CSI-RS) and a tracking reference signal (TRS); and
    transmitting the mapped synchronous signals on the P-SCH and the S-SCH.

2. The method of claim 1, wherein the method is applied in at least one of a frequency division duplex (FDD) communication system or time division duplex (TDD) communication system, and the P-SCH and the S-SCH have the same relative positions in the two communication systems.

3. The method of claim 2, wherein, in the TDD communication system, the P-SCH and the S-SCH comprise any of the following bearing modes:
    OFDM symbol 0 of downlink pilot time slot (DwPTS) bears the P-SCH;
    OFDM symbol 1 of a second time slot in a previous sub-frame of the DwPTS bears the S-SCH; and
    the OFDM symbol 0 and OFDM symbol 1 of the DwPTS respectively transmit the P-SCH and the S-SCH.

4. The method of claim 2, wherein, in the FDD communication system, the P-SCH and the S-SCH comprise any of the following bearing modes:
    OFDM symbol 1 of a second time slot of a sub-frame bears the P-SCH;
    OFDM symbol 2 of a first time slot of the sub-frame bears the S-SCH; and
    OFDM symbol 1 and the OFDM symbol 2 of the first time slot of the sub-frame respectively transmit the P-SCH and the S-SCH.

5. The method of claim 2, wherein the first OFDM symbols are not:
    the second OFDM symbols that can be used for bearing the CSI-RS for each of the FDD or the TDD communication system, or
    the second OFDM symbols that can be used for bearing the CSI-RS in both of the FDD and the TDD communication systems.

6. A method for receiving a synchronous channel by a terminal in a communication system, comprising:
    receiving signals;
    demapping synchronous signals from first orthogonal frequency division multiplexing (OFDM) symbols to obtain the synchronous signals transmitted on a primary synchronous channel (P-SCH) and a secondary synchronous channel (S-SCH) except for reference signals;
    demapping the reference signals from second OFDM symbols different from the first OFDM symbols, the reference signals including a user-specific demodulation reference signal (DMRS), a channel state indication reference signal (CSI-RS) and a tracking reference signal (TRS); and
    carrying out system synchronization based on the demapped synchronous signals.

7. The method of claim 6, wherein the method is applied to at least one of a frequency division duplex (FDD) communication system or time division duplex (TDD) communication system, and the P-SCH and the S-SCH have the same relative positions in the two communication systems.

8. The method of claim 7, wherein, in the TDD communication system, demapping the first OFDM symbols to obtain the synchronous signals comprises at least one of:
    obtaining a synchronous signal of the P-SCH from OFDM symbol 0 of downlink pilot time slot (DwPTS);
    obtaining a synchronous signal of the S-SCH from OFDM symbol 1 of a second time slot in a previous sub-frame of the DwPTS; and
    obtaining the synchronous signals of the P-SCH and the S-SCH, respectively, from previous two OFDM symbols of the DwPTS.

9. The method of claim 7, wherein, in the FDD communication system, demapping the first OFDM symbols to obtain the synchronous signals comprises one of:
    obtaining a synchronous signal of the P-SCH from OFDM symbol 1 of a second time slot of a sub-frame;
    obtaining a synchronous signal of the S-SCH from OFDM symbol 2 of a first time slot of the sub-frame; and
    obtaining the synchronous signals of the P-SCH and the S-SCH, respectively, from OFDM symbol 1 and the OFDM symbol 2 of the first time slot of the sub-frame.

10. A method for transmitting a broadcasting channel by a base station in a communication system, comprising:
    generating a broadcasting signal to be transmitted on a primary broadcasting channel (P-BCH);
    mapping the broadcasting signal except for a reference signal and synchronous signals to first orthogonal frequency division multiplexing (OFDM) symbols to form the P-BCH;
    mapping the reference signal and the synchronous signals to second OFDM symbols different from the first OFDM symbols, the reference signal including a channel state indication reference signal (CSI-RS); and
    transmitting the mapped broadcasting signal on the P-BCH.

11. The method of claim 10, wherein the first OFDM symbols are not:
    the second OFDM symbols that can be used for bearing the CSI-RS for each of a frequency division duplex (FDD) communication system or a time division duplex (TDD) communication system, or
    the second OFDM symbols that can be used for bearing the CSI-RS in both of the FDD communication system and the TDD communication system.

12. The method of claim 10, wherein, for each burst of the P-BCH, the number of resource elements (RE) for P-BCH transmission is determined by parameters of a current long term evolution (LTE) system.

13. The method of claim 12, wherein the first OFDM symbols occupied by the P-BCH are determined by an OFDM symbol of a user-specific demodulation reference signal (DMRS).

14. The method of claim 12, wherein the P-BCH is mapped to 4 OFDM symbols that transmit tracking reference signal (TRS).

15. The method of claim 10, wherein the P-BCH is transmitted in any of the following modes:
   for a normal cyclic prefix (CP) sub-frame, the P-BCH occupies OFDM symbols 0, 3, 4 of a first time slot and OFDM symbols 0, 1, 4 of a second time slot;
   for an extended CP sub-frame structure, the P-BCH occupies OFDM symbols 0, 3 of the first time slot and OFDM symbols 0, 1, 2, 3 of the second time slot;
   for an extended CP sub-frame structure, the P-BCH occupies OFDM symbols 0, 1, 2, 3 of the first time slot and OFDM symbols 0, 3 of the second time slot;
   for a normal CP sub-frame, the P-BCH occupies OFDM symbols 0, 1, 3, 4 of the first time slot, and OFDM symbols 0, 4 of the second time slot; and
   for an extended CP sub-frame structure, the P-BCH occupies OFDM symbols 0, 1, 3 of the first time slot and OFDM symbols 0, 2, 3 of the second time slot.

16. The method of claim 10, wherein the P-BCH comprises one or more of the following features:
   the number of occupied sub-carriers being smaller than a number of sub-carriers of 6 physical resource blocks (PRBs) and being equivalent to an integral number of PRBs;
   occupying PRB resource in a middle of a frequency band; and
   the PRB resource at both ends of a frequency resource of the 6 PRBs in the middle of the frequency band being used for transmitting the P-BCH.

17. A method for receiving a broadcasting channel by a terminal in a communication system, comprising:
   receiving signals;
   demapping a broadcasting signal except for a reference signal and synchronous signals from first orthogonal frequency division multiplexing (OFDM) symbols to obtain the broadcasting signal transmitted on a primary broadcasting channel (P-BCH);
   demapping the reference signal and the synchronous signals from second OFDM symbols different from the first OFDM symbols, the reference signal including a channel state indication reference signal (CSI-RS); and
   obtaining broadcasting information based on the demapped broadcasting signal.

18. The method of claim 17, wherein the first OFDM symbols are not:
   the second OFDM symbols that can be used for bearing the CSI-RS for each of frequency division duplex (FDD) communication system or a time division duplex (TDD) communication system, or
   the second OFDM symbols that can be used for bearing the CSI-RS in both of the FDD communication system and the TDD communication system.

19. The method of claim 17, wherein the P-BCH is transmitted in any of the following modes:
   for a normal cyclic prefix (CP) sub-frame, the P-BCH occupies OFDM symbols 0, 3, 4 of a first time slot and OFDM symbols 0, 1, 4 of a second time slot;
   for an extended CP sub-frame structure, the P-BCH occupies OFDM symbols 0, 3 of the first time slot and OFDM symbols 0, 1, 2, 3 of the second time slot;
   for an extended CP sub-frame structure, the P-BCH occupies OFDM symbols 0, 1, 2, 3 of the first time slot and OFDM symbols 0, 3 of the second time slot;
   for a normal CP sub-frame, the P-BCH occupies OFDM symbols 0, 1, 3, 4 of the first time slot and OFDM symbols 0, 4 of the second time slot; and
   for an extended CP sub-frame structure, the P-BCH occupies OFDM symbols 0, 1, 3 of the first time slot and OFDM symbols 0, 2, 3 of the second time slot.

20. The method of claim 17, wherein the P-BCH comprises one or more of the following features:
   a number of occupied sub-carriers being smaller than a number of sub-carriers of six physical resource blocks (PRBs) and being equivalent to an integral number of PRBs;
   occupying PRB resource in a middle of a frequency band; and
   the PRB resource at both ends of a frequency resource of the 6 PRBs in the middle of the frequency band being used for transmitting the P-BCH.

21. A base station in a communication system, comprising:
   a processor configured to:
      generate synchronous signals to be transmitted on a primary synchronous channel (P-SCH) and a secondary synchronous channel (S-SCH);
      map the synchronous signals except for reference signals to first orthogonal frequency division multiplexing (OFDM) symbols to form the P-SCH and the S-SCH, and
      map the reference signals to second OFDM symbols different from the first OFDM symbols, the reference signals including a user-specific demodulation reference signal (DMRS), a channel state indication reference signal (CSI-RS) and a tracking reference signal (TRS); and
   a transceiver configured to transmits the mapped synchronous signals on the P-SCH and the S-SCH.

22. The base station of claim 21, wherein the base station is in a frequency division duplex (FDD) communication system or time division duplex (TDD) communication system, and the P-SCH and the S-SCH have the same relative positions in the two communication systems.

23. A terminal in a communication system, comprising:
   a transceiver configured to receives signals; and
   a processor configured to:
      demap synchronous signals from first orthogonal frequency division multiplexing (OFDM) symbols to obtain the synchronous signals transmitted on a primary synchronous channel (P-SCH) and a secondary synchronous channel (S-SCH) except for reference signals,
      demap the reference signals from second OFDM symbols different from the first OFDM symbols, the reference signals including a user-specific demodulation reference signal (DMRS), a channel state indication reference signal (CSI-RS) and a tracking reference signal (TRS), and
      carry out system synchronization based on the demapped synchronous signals.

24. The terminal of claim 23, wherein the terminal is in a frequency division duplex (FDD) communication system or a time division duplex (TDD) communication system, and the P-SCH and the S-SCH have the same relative positions in the two communication systems.

25. A base station in a communication system, comprising:

a processor configured to:
  generate a broadcasting signal to be transmitted on a primary broadcasting channel (P-BCH),
  map the broadcasting signal except for a reference signal and synchronous signals to first orthogonal frequency division multiplexing (OFDM) symbols to form the P-BCH, and
  map the reference signal and the synchronous signals to second OFDM symbols different from the first OFDM symbols, the reference signal including a channel state indication reference signal (CSI-RS); and
a transceiver configured to transmit the mapped broadcasting signal on the P-BCH.

26. A terminal in a communication system, comprising:
a transceiver configured to receive signals; and
a processor configured to:
  demap a broadcasting signal except for a reference signal and synchronous signals from first orthogonal frequency division multiplexing (OFDM) symbols to obtain the broadcasting signal transmitted on a primary broadcasting channel (P-BCH),
  demap the reference signal and the synchronous signals from second OFDM symbols different from the first OFDM symbols, the reference signals including a channel state indication reference signal (CSI-RS) or synchronous signals, and
  obtain broadcasting information based on the demapped broadcasting signal.

\* \* \* \* \*